United States Patent
Fischer et al.

(10) Patent No.: US 11,808,872 B2
(45) Date of Patent: Nov. 7, 2023

(54) ON-DEMAND POSITIONING REFERENCE SIGNAL CONFIGURATION

(71) Applicant: QUALCOMM Incorporated, San Diego, CA (US)

(72) Inventors: Sven Fischer, Nuremberg (DE); Stephen William Edge, Escondido, CA (US); Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/866,790

(22) Filed: Jul. 18, 2022

(65) Prior Publication Data

US 2022/0373636 A1   Nov. 24, 2022

Related U.S. Application Data

(63) Continuation of application No. 17/684,158, filed on Mar. 1, 2022.
(Continued)

(51) Int. Cl.
*G01S 5/02*      (2010.01)
*G01S 5/00*      (2006.01)
*H04L 5/00*      (2006.01)

(52) U.S. Cl.
CPC .......... *G01S 5/0236* (2013.01); *G01S 5/0063* (2013.01); *H04L 5/0051* (2013.01)

(58) Field of Classification Search
CPC ..... G01S 5/0236; G01S 5/0063; H04L 5/0051
(Continued)

(56) References Cited

U.S. PATENT DOCUMENTS 10,341,980 B2   7/2019   Park et al.
2016/0007222 A1   1/2016   Siomina et al.
(Continued)

FOREIGN PATENT DOCUMENTS

CN   106680770       5/2017
CN   106680770 A     5/2017
(Continued)

OTHER PUBLICATIONS

3GPP TS 37.355: "3rd Generation Partnership Project, Technical Specification Group Radio Access Network, LTE Positioning Protocol (LPP) (Release 16)", 3GPP Standard, Technical Specification, 3GPP TS 37.355 V16.0.0 (Mar. 2020), 3rd Generation Partnership Project (3GPP), Mobile Competence Centre, 650, Route Des Lucioles, F-06921 Sophia-Antipolis Cedex, France, No. V16.0.0, Apr. 13, 2020 (Apr. 13, 2020), pp. 1-281, XP051893977, Retrieved from the Internet: URL: https://ftp.3gpp.org/Specs/archive/37_series/37.355/37355-g00.zip, 37355- g00.docx, [retrieved on Apr. 13, 2020], Sections 6.4.3.1, Section 6.5.3.2, Section 6.5.12.4, p. 25-p. 30, p. 271-p. 276.
(Continued)

*Primary Examiner* — Shaima Q Aminzay
(74) *Attorney, Agent, or Firm* — QUALCOMM Incorporated

(57) ABSTRACT

Techniques are discussed herein for providing on-demand positioning reference signals (PRS) to user equipment (UE). An example method for determining a location of a user equipment according to the disclosure includes receiving a first assistance data associated with a first positioning reference signal configuration, transmitting a request to modify one or more parameters of the first positioning reference signal configuration, receiving a second assistance data associated with a second positioning reference signal configuration, wherein the second positioning reference signal
(Continued)

configuration is based at least in part on the request to modify the one or more parameters of the first positioning reference signal configuration, obtaining measurements from one or more positioning reference signals based at least in part on the second assistance data, and determining the location based at least on part on measurements obtained from the one or more positioning reference signals.

30 Claims, 15 Drawing Sheets

Related U.S. Application Data

(60) Provisional application No. 63/186,226, filed on May 10, 2021.

(58) Field of Classification Search
USPC .......................................................... 455/75
See application file for complete search history.

(56) References Cited

U.S. PATENT DOCUMENTS

| | | |
|---|---|---|
| 2017/0102447 A1 | 4/2017 | Choi et al. |
| 2017/0280280 A1* | 9/2017 | Jain ..................... H04W 4/02 |
| 2020/0021946 A1 | 1/2020 | Kumar et al. |
| 2020/0028648 A1 | 1/2020 | Akkarakaran et al. |
| 2020/0053661 A1 | 2/2020 | Yang et al. |
| 2021/0219103 A1 | 7/2021 | Wang et al. |
| 2021/0360570 A1* | 11/2021 | Manolakos ........... G01S 1/0428 |
| 2022/0173857 A1 | 6/2022 | Michalopoulos et al. |
| 2022/0322036 A1 | 10/2022 | Yilmaz et al. |
| 2022/0404452 A1 | 12/2022 | Fischer et al. |
| 2023/0079536 A1 | 3/2023 | Yu et al. |

FOREIGN PATENT DOCUMENTS

| | | |
|---|---|---|
| WO | 2012008727 | 1/2012 |
| WO | WO-2012008727 A2 | 1/2012 |
| WO | 2017172138 | 10/2017 |
| WO | WO-2017172138 A1 | 10/2017 |
| WO | 2022073598 A1 | 4/2022 |
| WO | 2022211526 A1 | 10/2022 |
| WO | 2022212201 A1 | 10/2022 |

OTHER PUBLICATIONS

ETSI TS 138 214: "5G; NR; Physical Layer Procedures for Data (3GPP TS 38.214 Version 16.4.0 Release 16)", ETSI TS 138 214 V16.4.0 (Jan. 2021), 173 Pages.
ERICSSON: "Report on [Post112-e] [608] [POS] Support of on-Demand Prs", 3GPP Tsg-Ran WG2 #113e, R2-2101389, 3rd Generation Partnership Project, Mobile Competence Centre, 650, Route Des Lucioles, F-06921 Sophia-Antipolis Cedex, France, vol. Ran WG2, No. Electronic Meeting, Jan. 25, 2021-Feb. 5, 2021, Jan. 14, 2021, XP051974319, pp. 1-19, sec.3.2.
Huawei, et al., "Summary of Al 8.11.4 for On-Demand PRS Request", 3GPP Tsg-Ran WG2 Meeting #113bis-e, R2-2104507, 3rd Generation Partnership Project, Mobile Competence Centre, 650, Route Des Lucioles, F-06921 Sophia-Antipolis Cedex, France, vol. RAN WG2, No. Electronic, Apr. 12, 2021-Apr. 20, 2021, Apr. 13, 2021, XP051995284, pp. 1-23, p. 2, p. 4-p. 6, p. 10.
International Search Report and Written Opinion—PCT/US2022/023645—ISA/EPO—dated Jul. 6, 2022.
Lenovo., et al., "On-Demand DL-PRS Support", R2-2103384, 3GPP TSG RAN WG2 Meeting #113-bis-e, Online, Apr. 12-20, 2021, pp. 1-5.
Xiaomi: "Discussion on on-Demand Dl Prs Procedure", R2-2103132, 3GPP TSG RAN WG2 #113bis, e-Meeting, Apr. 12-5, 2021, pp. 1-5.

* cited by examiner

ON-DEMAND POSITIONING REFERENCE SIGNAL CONFIGURATION

CROSS-REFERENCE TO RELATED APPLICATION

This application is a continuation of U.S. application Ser. No. 17/684,158, filed Mar. 1, 2022, entitled "ON-DEMAND POSITIONING REFERENCE SIGNAL CONFIGURATION," which claims priority to U.S. Provisional Application No. 63/186,226, filed May 10, 2021, entitled "ON-DEMAND POSITIONING REFERENCE SIGNAL CONFIGURATION," each of which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in position related signaling may improve the efficiency of mobile devices.

SUMMARY

An example method for determining a location of a user equipment according to the disclosure includes receiving a first assistance data associated with a first positioning reference signal configuration, transmitting a request to modify one or more parameters of the first positioning reference signal configuration, receiving a second assistance data associated with a second positioning reference signal configuration, wherein the second positioning reference signal configuration is based at least in part on the request to modify the one or more parameters of the first positioning reference signal configuration, obtaining measurements from one or more positioning reference signals based at least in part on the second assistance data, and determining the location based at least on part on measurements obtained from the one or more positioning reference signals.

Implementations of such a method may include one or more of the following features. The first assistance data may include an indication of one or more positioning reference signal configuration parameters which may be modified on-demand. The first assistance data may be received via one or more positioning system information blocks transmitted by a base station. The request to modify the one or more parameters of the first positioning reference signal configuration may include a request to modify at least one of a positioning reference signal bandwidth, a duration of a positioning occasion, and a frequency of the positioning occasion. The request to modify the one or more parameters of the first positioning reference signal configuration may include a positioning reference configuration identifier that is associated with one or more positioning reference signal parameters. The request to modify the one or more parameters of the first positioning reference signal configuration may be included in a mobile-originated location request message. The second assistance data may be received from a location management function via a Long Term Evolution Positioning Protocol message. The first assistance data may be associated with a plurality of positioning reference signal configurations, and transmitting the request to modify the one or more parameters may include providing an identifier associated with one of the plurality of positioning reference signal configurations. Receiving the second assistance data may include receiving the identifier associated with the one of the plurality of positioning reference signal configurations.

An example method for providing assistance data associated with on-demand positioning reference signals according to the disclosure includes sending a first assistance data associated with a first positioning reference signal configuration to a user equipment, receiving a request to modify one or more parameters of the first positioning reference signal configuration from the user equipment, generating a second assistance data associated with a second positioning reference signal configuration, wherein the second positioning reference signal configuration is based at least in part on the request to modify the one or more parameters of the first positioning reference signal configuration, and sending the second assistance data to the user equipment.

Implementations of such a method may include one or more of the following features. The first assistance data may include an indication of one or more positioning reference signal configuration parameters which may be modified on-demand. Sending the first assistance data may include providing one or more positioning system information blocks to a base station. The request to modify the one or more parameters of the first positioning reference signal configuration may include a request to modify at least one of a positioning reference signal bandwidth, a duration of a positioning occasion, and a frequency of the positioning occasion. The request to modify the one or more parameters of the first positioning reference signal configuration may include a positioning reference configuration identifier that is associated with one or more positioning reference signal parameters. The request to modify the one or more parameters of the first positioning reference signal configuration may be included in a mobile-originated location request message. The second assistance data may be included in a Long Term Evolution Positioning Protocol message. The first assistance data may be associated with a plurality of positioning reference signal configurations, and the request to modify the one or more parameters may include an identifier associated with one of the plurality of positioning reference signal configurations. The second assistance data may include the identifier associated with the one of the plurality of positioning reference signal configurations.

An example method for transmitting on-demand positioning reference signals according to the disclosure includes transmitting one or more positioning reference signals based on a first positioning reference signal configuration, receiving a request to modify one or more parameters of the first positioning reference signal configuration, and transmitting one or more positioning reference signals based on a second positioning reference signal configuration, wherein the second positioning reference signal configuration is based at least in part on the request to modify the one or more parameters of the first positioning reference signal configuration.

Implementations of such a method may include one more of the following features. The request to modify the one or more parameters of the first positioning reference signal configuration may include a request to modify at least one of a positioning reference signal bandwidth, a duration of a positioning occasion, and a frequency of the positioning occasion. The request to modify the one or more parameters of the first positioning reference signal configuration may include a start time and a duration for transmitting the one or more positioning reference signals based on the second positioning reference signal configuration. The request to modify the one or more parameters of the first positioning reference signal configuration may include a positioning reference configuration identifier that is associated with one or more positioning reference signal parameters. The second positioning reference signal configuration may include a desired beam direction.

An example apparatus according to the disclosure includes a memory, at least one transceiver, at least one processor communicatively coupled to the memory and the at least one transceiver, and configured to receive a first assistance data associated with a first positioning reference signal configuration, transmit a request to modify one or more parameters of the first positioning reference signal configuration, receive a second assistance data associated with a second positioning reference signal configuration, wherein the second positioning reference signal configuration is based at least in part on the request to modify the one or more parameters of the first positioning reference signal configuration, obtain measurements from one or more positioning reference signals based at least in part on the second assistance data, and determine a location based at least on part on measurements obtained from the one or more positioning reference signals.

An example apparatus according to the disclosure includes a memory, at least one transceiver, at least one processor communicatively coupled to the memory and the at least one transceiver, and configured to send a first assistance data associated with a first positioning reference signal configuration to a user equipment, receive a request to modify one or more parameters of the first positioning reference signal configuration from the user equipment, generate a second assistance data associated with a second positioning reference signal configuration, wherein the second positioning reference signal configuration is based at least in part on the request to modify the one or more parameters of the first positioning reference signal configuration, and send the second assistance data to the user equipment.

An example apparatus according to the disclosure includes a memory, at least one transceiver, at least one processor communicatively coupled to the memory and the at least one transceiver, and configured to transmit one or more positioning reference signals based on a first positioning reference signal configuration, receive a request to modify one or more parameters of the first positioning reference signal configuration, and transmit one or more positioning reference signals based on a second positioning reference signal configuration, wherein the second positioning reference signal configuration is based at least in part on the request to modify the one or more parameters of the first positioning reference signal configuration.

DETAILED DESCRIPTION

Figure 1:
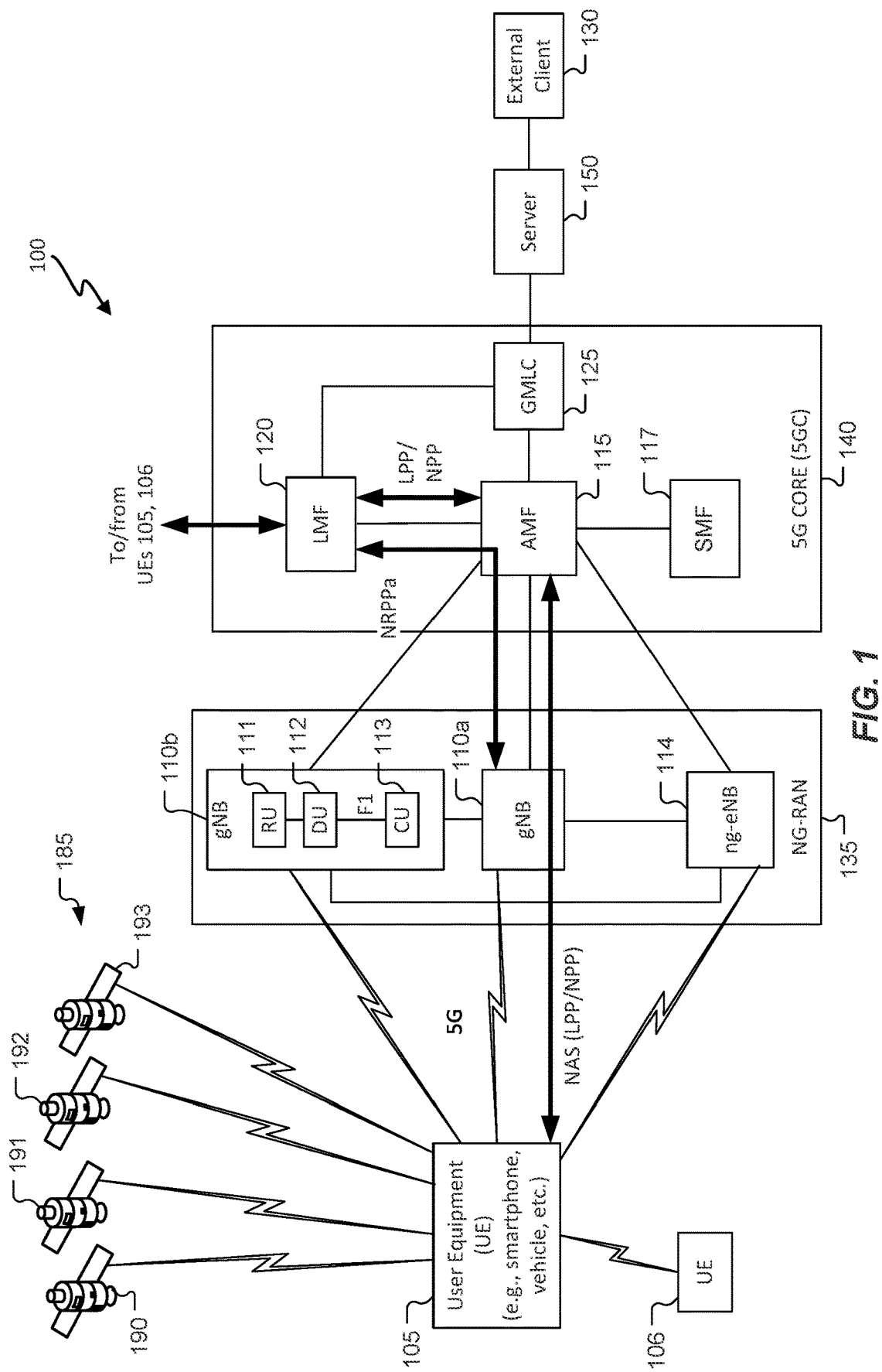
FIG. 1 is a simplified diagram of an example wireless communications system.

Techniques are discussed herein for providing on-demand positioning reference signals (PRS) to user equipment (UE). Prior implementations of Downlink (DL) PRS transmissions are typically in an "always-on" configuration such that a base station will transmit PRS regardless of the requirements of the UEs in the network. Such an "always-on" configuration may utilize scarce resources such as bandwidth, energy, as well as require unnecessary overhead when UE positioning is not required during a particular time or in a particular area of a network. In networks which utilize beamformed DL-PRS transmissions (e.g., 5G NR), the DL-PRS transmissions in all beam sweeping directions may result in unnecessary transmissions of DL-PRSs. The "always-on" configuration may also utilize static allocation of DL-PRS resources. In general, a static DL-PRS resource allocation does not allow for temporary increases of the DL-PRS resources to realize higher positioning accuracy and/or lower latency positioning requirements in certain areas or at certain times. Similarly, the static allocation of DL-PRS resources does not allow for a decrease of DL-PRS resources in case the positioning requirements can be met with fewer DL-PRS resources.

The on-demand DL-PRS techniques described herein enable a network to change the DL-PRS resource allocation dynamically as required (e.g., based on the requirements for a particular use case or application). In an example, the on-demand DL-PRS techniques may enable a network to dynamically vary configuration parameters such as a DL-PRS occasion periodicity, a duration of the DL-PRS occasions, a DL-PRS bandwidth, and a DL-PRS spatial direction.

In operation, a network may not allow a UE to request specific DL-PRS parameters (e.g., bandwidth, periodicity, etc.), and may limit the possible DL-PRS configurations a UE is able to request. For example, a network may define a DL-PRS configuration suitable for high accuracy positioning, another DL-PRS configuration for medium accuracy positioning, and another DL-PRS configuration for low accuracy positioning, or similar. A UE may then request a particular DL-PRS configuration suitable for the current situation. In an example, the UE may be configured to include an identifier field, or other information, associated with a pre-defined or pre-configured DL-PRS configuration instead of the individual parameter which define a DL-PRS configuration. Such an identifier field, however, may require a-priori knowledge at the UE regarding which specific DL-PRS configurations are available in the network and whether the UE is allowed to request such a DL-PRS configuration from the network.

In an embodiment, the on-demand DL-PRS procedures provided herein may utilize a new Assistance Data Information Element (IE) which includes a set of possible DL-PRS configurations (e.g., IE On-Demand-DL-PRS-Configurations). Each DL-PRS configuration in the set may include a number of associated DL-PRS parameters, defining the e.g. bandwidth, duration, power, periodicity, muting, etc. In an example, each DL-PRS configuration in the set may be identified by a DL-PRS Configuration Identifier, or similar field. The On-Demand-DL-PRS-Configuration IE may be included in a Positioning System Information Block (posSIB) which may be included in Positioning System Information (posSI) broadcasts. A UE may be configured to receive the new posSIB and would store the IE On-Demand-DL-PRS-Configuration information. The UE may be configured to obtain the posSIB in different Radio Resource Control (RRC) states (i.e., RRC_IDLE, RRC_INACTIVE, RRC_CONNECTED) and thus will be aware which specific DL-PRS configurations may be requested on-demand.

In an example, when the UE requires a DL-PRS configuration for performing positioning measurements (e.g., upon a location request from an UE internal client (e.g., an App)), the UE may initiate a mobile-originated location request (MO-LR) procedure and send a request assistance data message to a network entity such as a Location Management Function (LMF). The request assistance data message may include the DL-PRS Configuration identifier associated with the desired DL-PRS configuration. The network entity may then configure one or more base stations (e.g., gNBs) with the requested DL-PRS configuration and may provide the associated DL-PRS assistance data of the new DL-PRS configuration to the UE as part of the MO-LR procedure. The UE may then be configured to perform the DL-PRS measurements, to calculate a location, and provide the location to an internal client. The same procedure may be utilize for location requests from external clients and for UE-assisted modes (e.g., when the UE is required to obtain DL-PRS measurements but there are insufficient DL-PRS currently available, and the UE requests a particular DL-PRS from the set of allowed and (via broadcast) preconfigured on-demand DL-PRS configurations. These techniques and configurations are examples, and other techniques and configurations may be used.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), UE Receive minus Transmit Time Difference (Rx-Tx Time Difference), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, Rx-Tx Time Difference, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
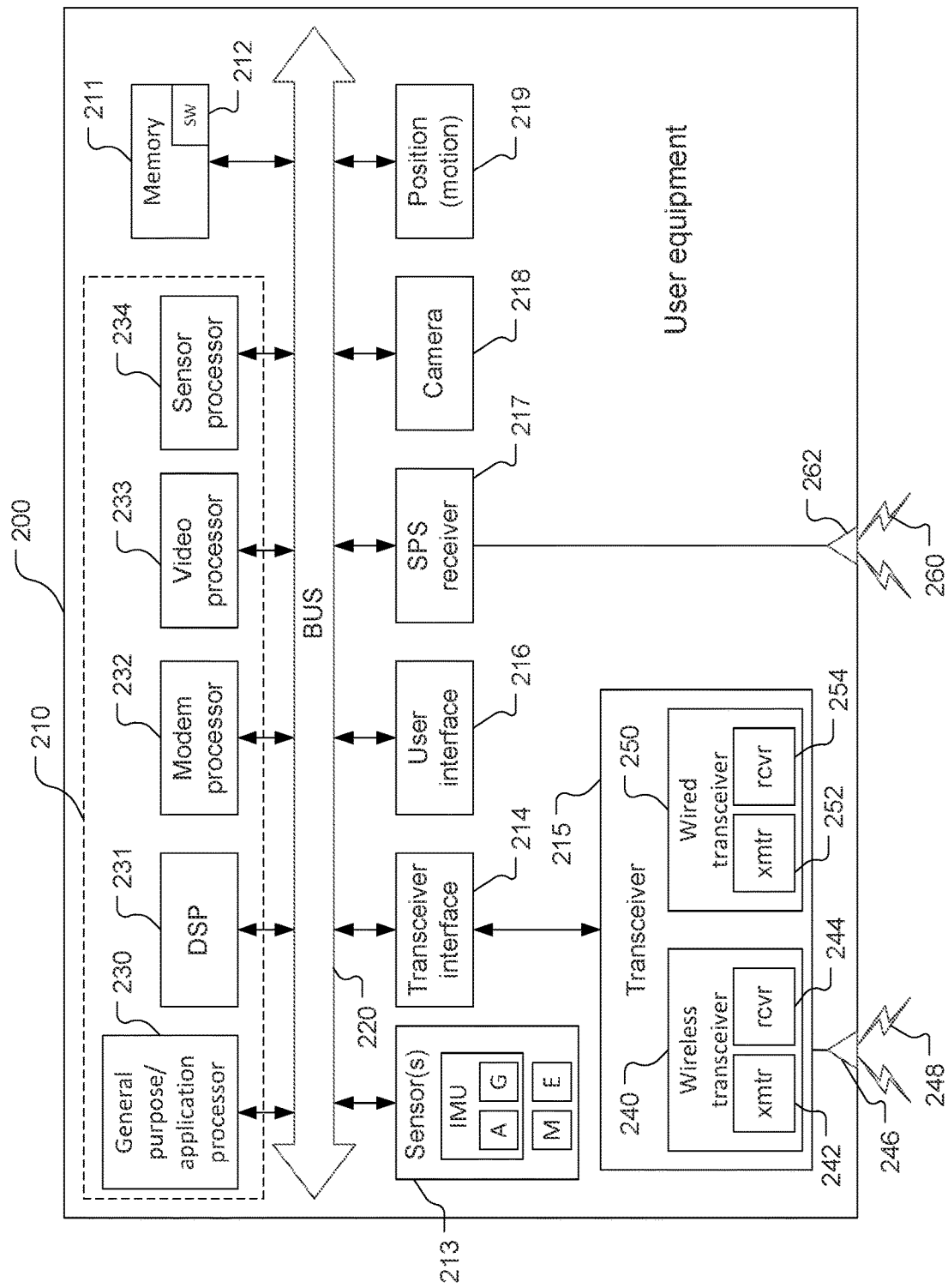
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6GHz and/or 100 GHz and higher (e.g., FR2x, FR3, FR4). The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
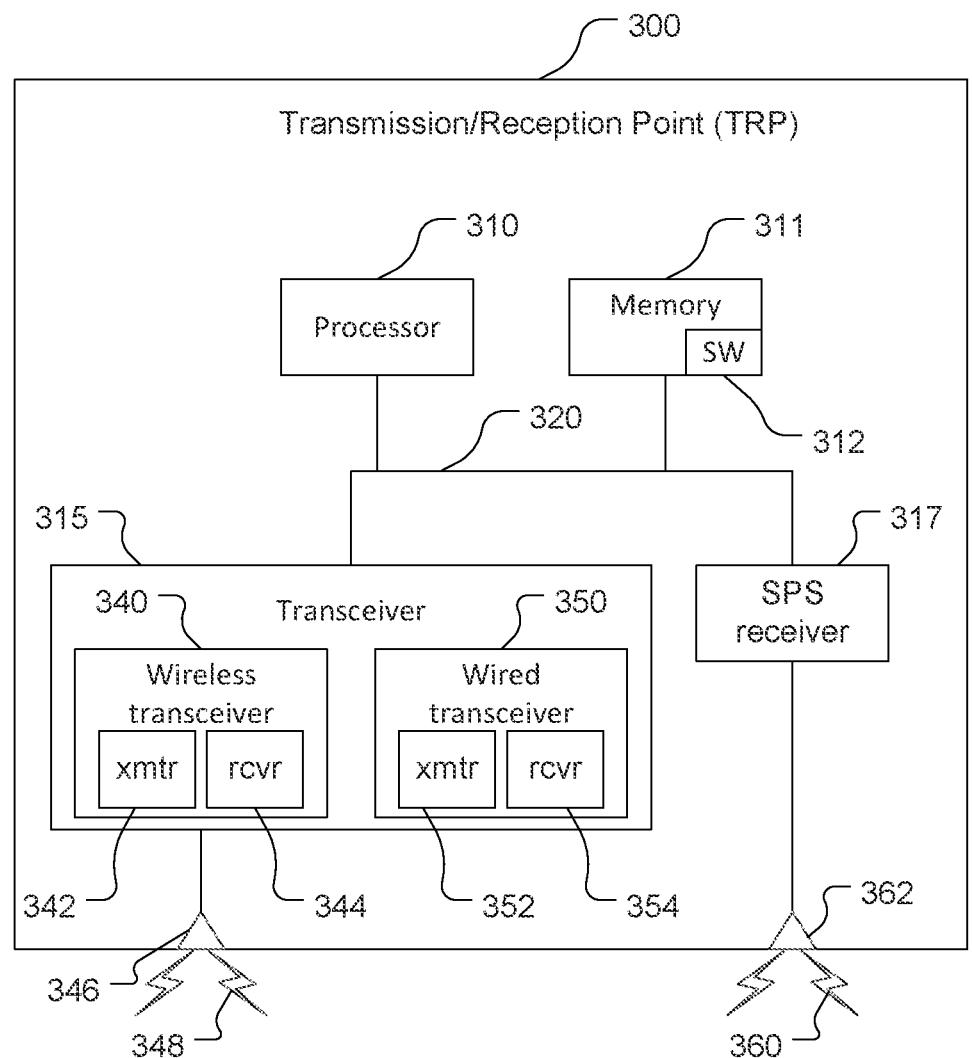
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, a transceiver 315, and (optionally) a SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless transceiver and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
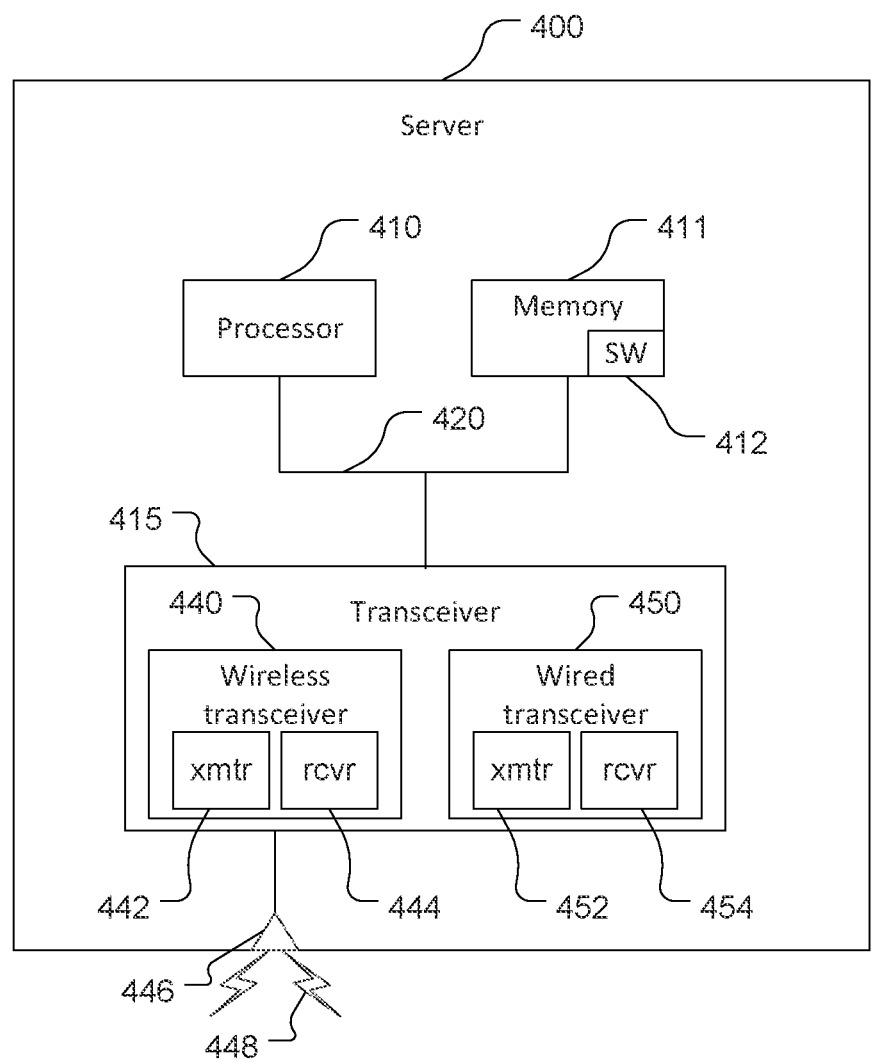
FIG. 4 is a block diagram of components of an example server shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Rx-Tx Time Measurement, Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE Rx-Tx or UE Rx-Tx) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information—Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID)

transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
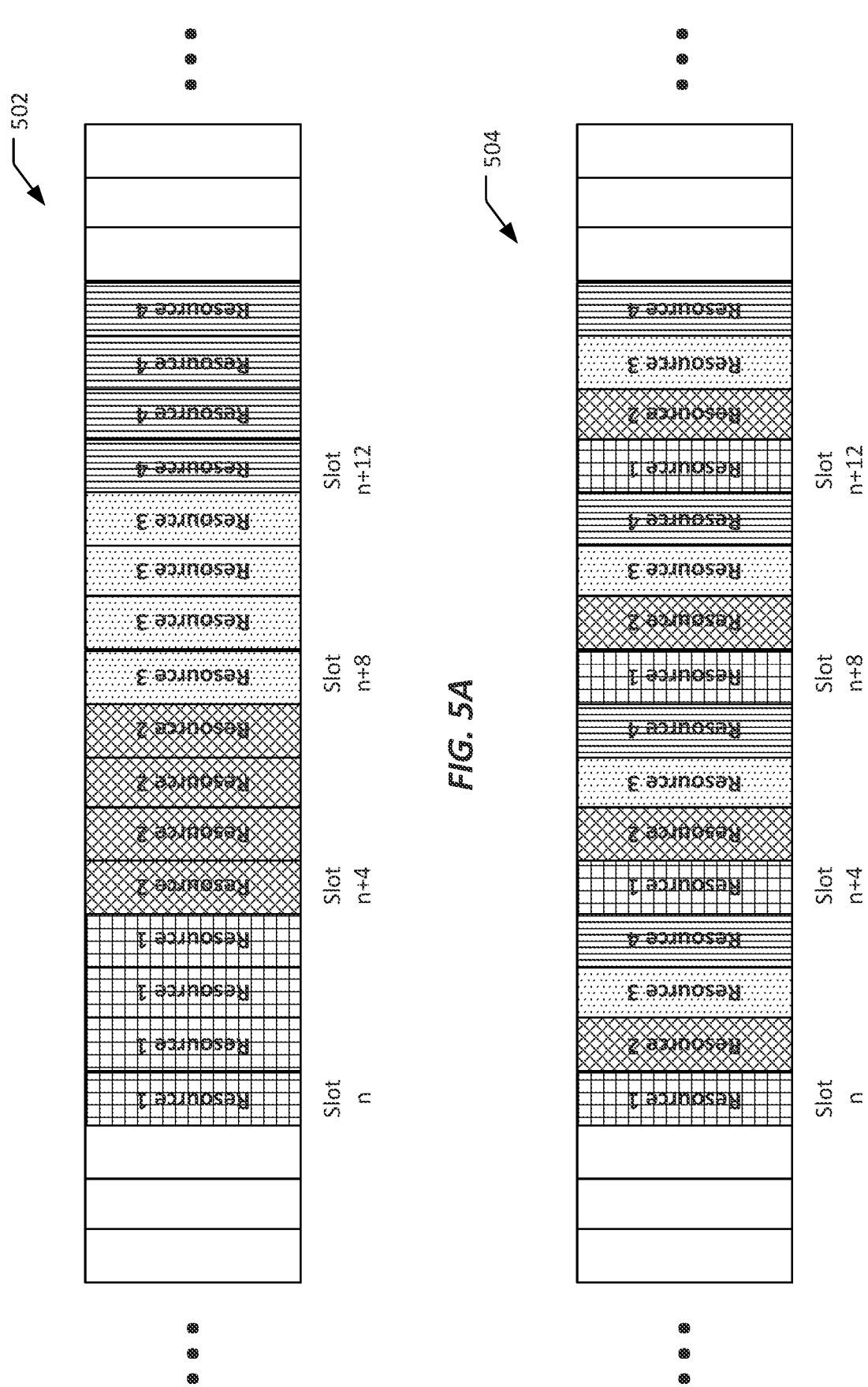
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
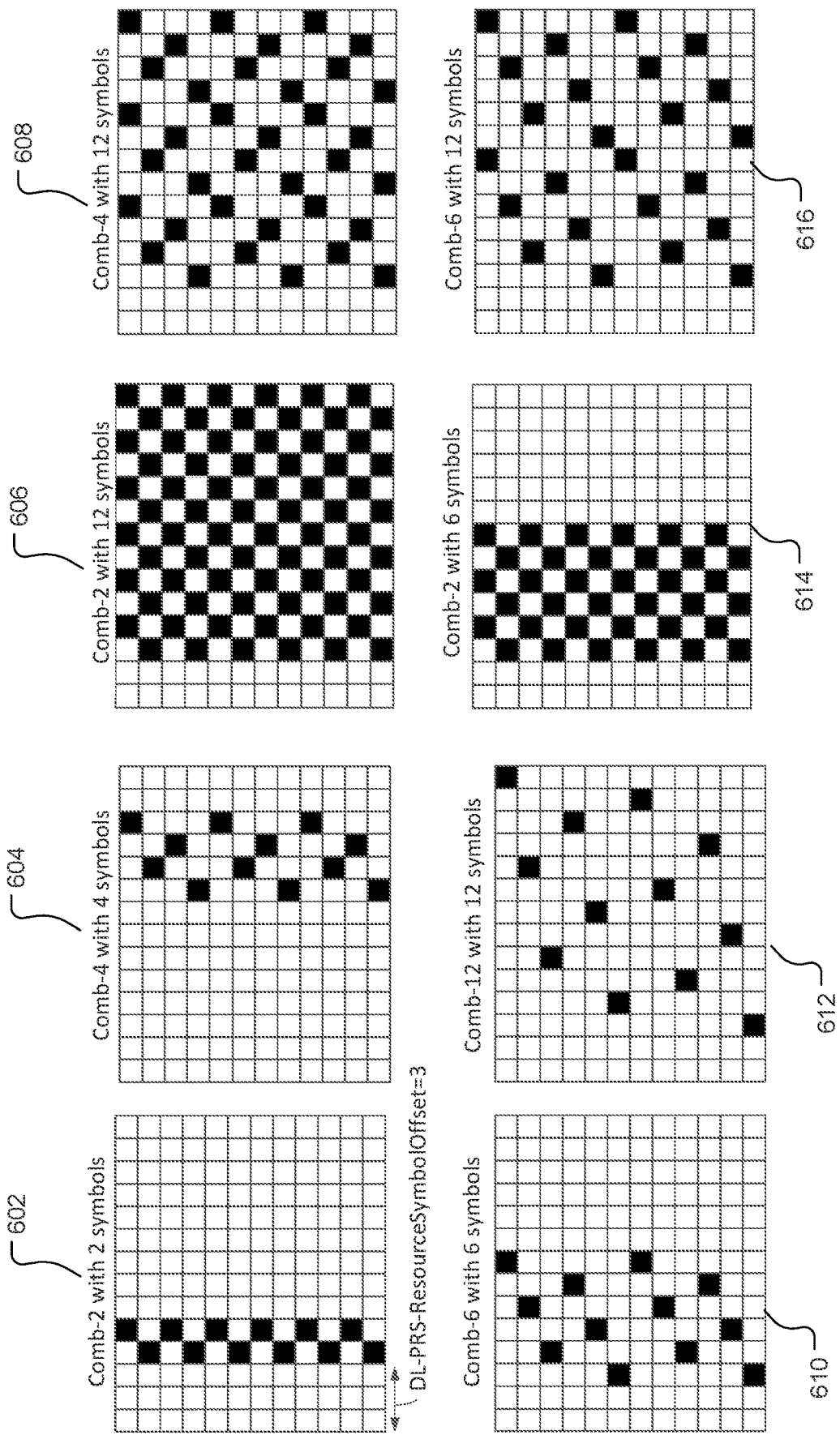
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
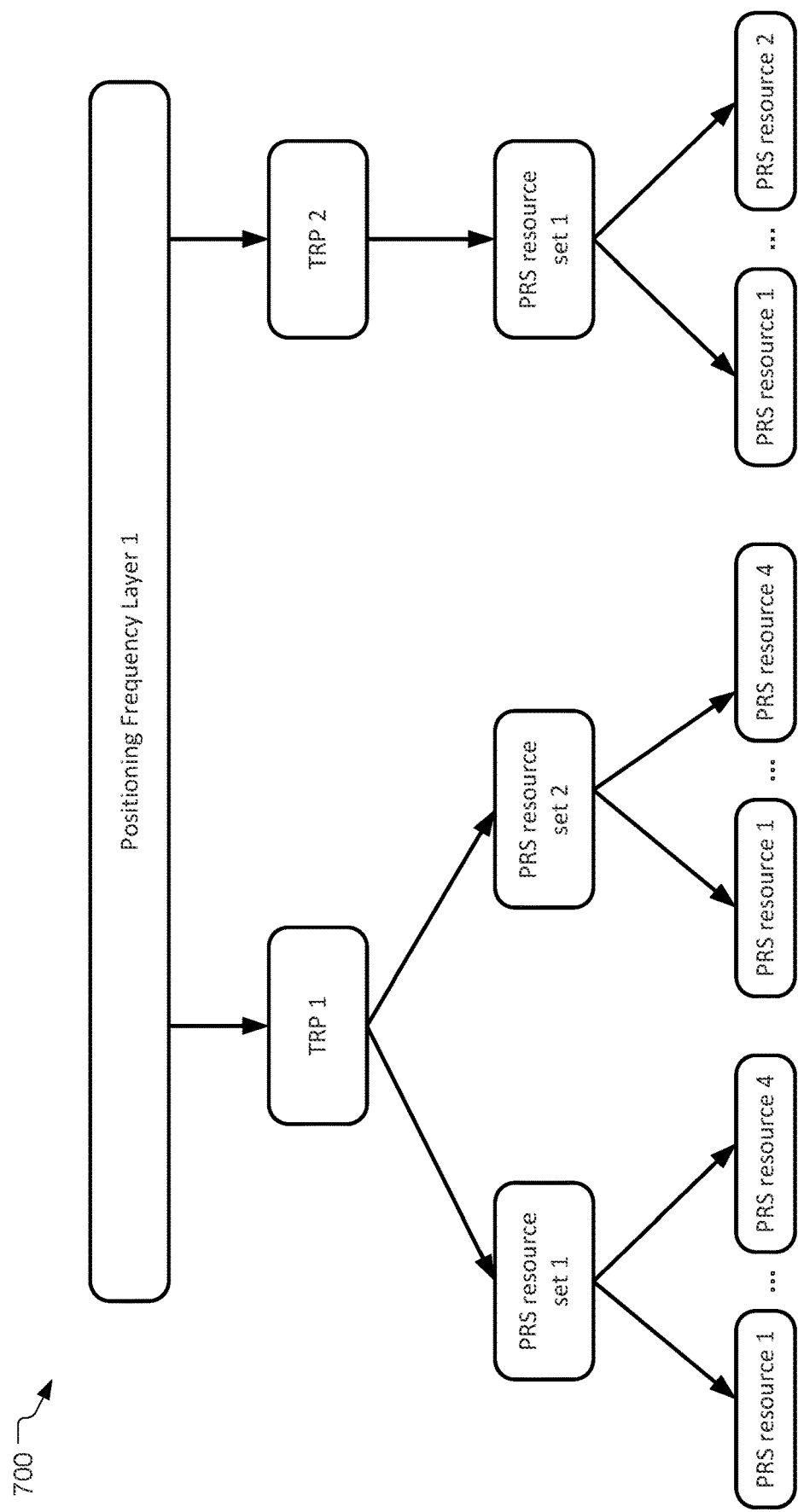
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15kHz, 30kHz, 60kHz, and the maximum number for the FR2 bands may be 1, 2, 4, 6, 8, 12, 16, 24, 32, 48, 64 for each SCS: 15kHz, 30kHz, 60kHz, 120kHz.

Figure 8:
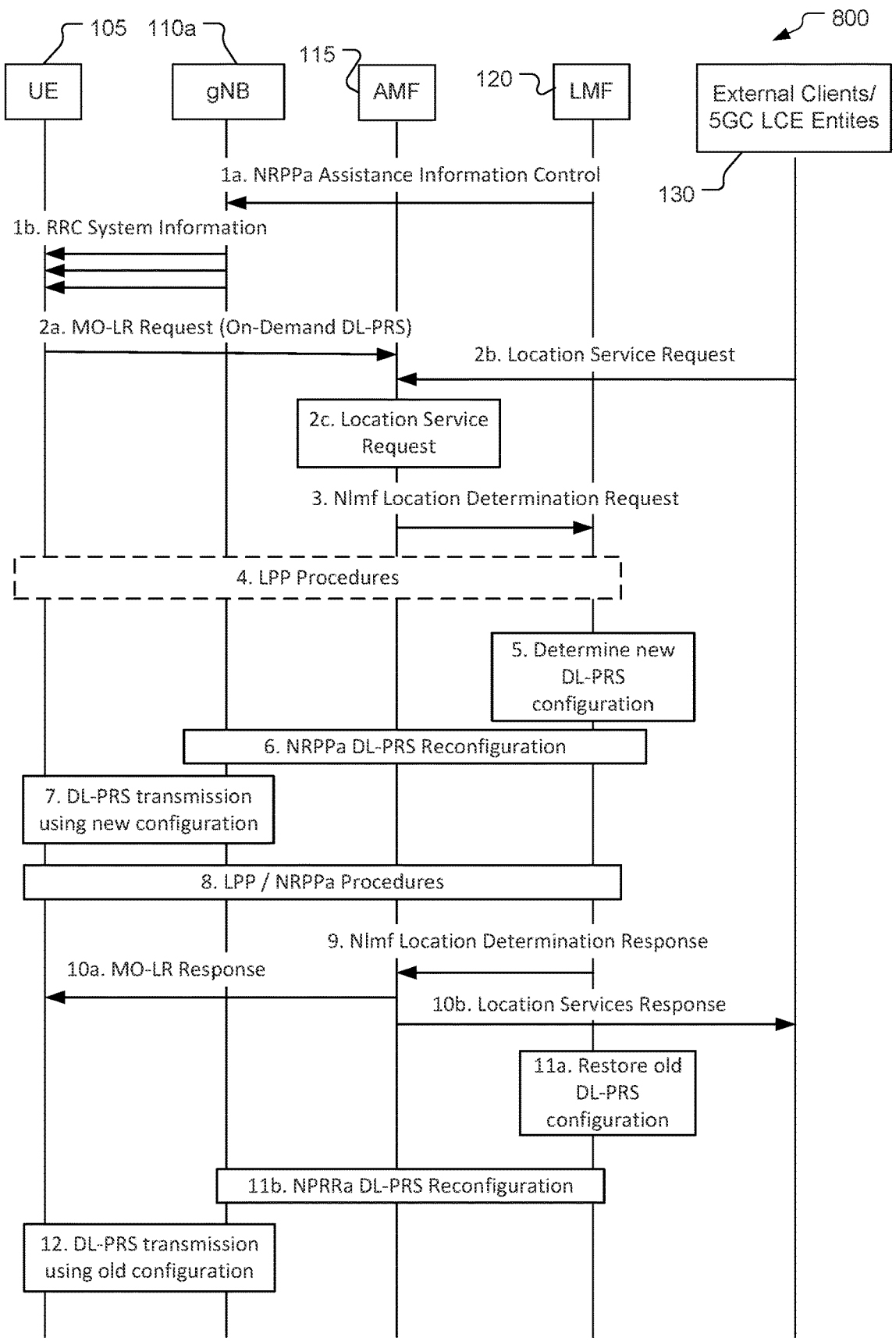
FIG. 8 is an example message flow diagram for an on-demand DL-PRS procedure.

Referring to FIG. 8, an example message flow 800 for an on-demand DL-PRS procedure is shown. The example message flow 800 includes the UE 105 and an example TRP 300 such as the a gNB1 110a, and elements of the core network 140 such as the AMF 115, the LMF 120 and an external client 130. The message flow 800 may be used to extend existing MO-LR procedures for requesting assistance data (e.g., for DL-TDOA, DL-AoD or multi-RTT). For example, the UE 105 may be configured to request assistance data from the LMF 120 for UE assisted or UE based positioning using one or more of the positioning methods and may include additional parameters for indicating preferences for DL-PRS. The additional parameters may describe, for example, a desired PRS configuration and may include one or more of a preferred time or time period for the PRS configuration (e.g. current time, start time plus stop time), a preferred PRS resource bandwidth, a preferred duration of PRS positioning occasions, a preferred periodicity of the PRS positioning occasions, a preferred carrier frequency or frequency layer for the PRS resources, a preferred number and locations of gNBs/TRPs for which the PRS configuration around the UE location is requested, where the location of the gNBs/TRPs may be specified using a PCI or CGI, or as a specific location or a geographical region which may be expressed in absolute global coordinates or using a zone-identifier (e.g., similar to zone-ID used in NR Rel-16 Sidelink), or using coordinates relative to a known reference location (such as the location of a specific cell, such as the serving cell, provided to the UE in the assistance data), a preferred PRS beam direction or directions for individual gNBs, RSRP or RSRQ measurements performed by the UE on available DL signals (e.g., measurements for Radio Resource Management (RRM)), a Quality of Service (QoS) parameter describing the target location accuracy and latency (e.g., desired accuracy and response time for any location estimate based on PRS measurements (e.g., as requested by an UE internal client (e.g., an App))), and the PRS capabilities of the UE (e.g. as defined for LPP). Other parameters may also be used based on the configurations and capabilities of the respective gNBs and UEs.

In an embodiment, the UE 105 may have no information on the possible on-demand DL-PRS configurations that are available. In this case the UE 105 may send one or more messages, such as a LPP Request Assistance Data message, including the parameters for a desired DL-PRS configuration (e.g., one or more of the configuration parameters in FIG. 9). In an example, the DL-PRS parameters as defined in LPP IEs NR-DL-PRS-AssistanceData and NR-DL-PRS-Info may be provided explicitly to the LMF 120 in a LPP Request Assistance Data message.

In an embodiment, the UE 105 may have one or more preconfigured or predefined DL-PRS configurations available which may be requested on-demand. In an example, each preconfigured or predefined DL-PRS configuration may have a set of associated DL-PRS parameters (e.g., one or more of the configuration parameters in FIG. 9) and may be identified by a DL-PRS Configuration Identifier/Index value (e.g., as depicted in FIG. 10). The LPP Request Assistance Data message may include the DL-PRS Configuration Identifier/Index of a desired on-demand DL-PRS configuration (or a list of desired DL-PRS Configuration Identifications/Indices sorted according to priority). In another example, the LPP Request Assistance Data message includes a list of those DL-PRS parameters (e.g., one or more of the configuration parameters in FIG. 9) which are requested to change compared to a preconfigured DL-PRS configuration. For example, the LPP Request Assistance Data message may include a request to change the DL-PRS bandwidth, or the DL-PRS beam direction, etc. in a previously provided DL-PRS assistance data message.

The set of possible on-demand DL-PRS configurations may be defined by a "primary DL-PRS configuration" (e.g., defining a default DL-PRS) and one or more "secondary DL-PRS configurations", where the secondary DL-PRS configurations may include those DL-PRS parameters which are different compared to the primary DL-PRS configuration (i.e., using delta-encoding/signaling to reduce the overhead). This set of possible on-demand DL-PRS configurations may be defined as a new LPP assistance data IE which may also be mapped to a new posSIB for broadcast of possible on-demand DL-PRS configurations. The new posSIB type may be configured to define the list of possible on-demand DL-PRS configurations (which may not be currently active) together with an identifier value.

In an example, a LPP Request Assistance Data message may be configured to include the explicit parameter list for a desired DL-PRS configuration to support on-demand DL-PRS. A new LPP assistance data IE containing a set of possible DL-PRS configurations which may be requested by the UE on demand (e.g., IE On-Demand-DL-PRS-Configurations). Each DL-PRS configuration in IE On-Demand-DL-PRS-Configurations may have a set of associated DL-PRS parameters (e.g. one or more of the configuration parameters in FIG. 9) and an identifier. In an example, a posSIB type may be configured to include the LPP IE On-Demand-DL-PRS-Configurations. In an example, the LPP Request Assistance Data message may include an index/pointer/identifier corresponding to an element in the LPP IE On-Demand-DL-PRS-Configurations defining the requested on-demand DL-PRS.

In operation, the enhanced LPP Request Assistance Data messages may be included in an MO-LR Request message (e.g., in the case of an UE internal LCS Client) or may be part of an active/ongoing LPP session (e.g., to modify a provided DL-PRS configuration). The LMF 120 may be configured to request a change of DL-PRS transmissions from multiple gNBs/TRPs.

Referring to the message flow 800, at steps 1a and 1b the LMF 120 may provide one or more posSIBs containing a set of possible on-demand DL-PRS configurations to the gNB 110a in an NRPPa Assistance Information Control message for broadcast in positioning System Information. The set of possible on-demand DL-PRS configurations may contain a primary DL-PRS configuration (e.g., a default DL-PRS configuration) and one or more secondary DL-PRS configurations where the secondary DL-PRS configurations may define a possible change in DL-PRS compared to the primary DL-PRS configuration (e.g. different bandwidth, duration of positioning occasions and/or frequency of positioning occasions, etc.). Each possible on-demand DL-PRS configuration is associated with a unique identifier. Alternatively, or in addition, a posSIB may also indicate which specific DL-PRS parameters can be requested to be changed on-demand.

At step 2a, the UE 105 may be configured to send an MO-LR Request message included in an UL NAS TRANSPORT message to the serving AMF 115 including a request for on-demand DL-PRS transmission. The MO-LR request may include an LPP Request Assistance Data message defining the parameters for a preferred DL-PRS configuration which may also include a start time and/or a time duration for when and/or how long the requested DL-PRS configuration is required at the UE (e.g., number of seconds, minutes or hours). The request may in addition include a LPP Provide Capabilities message including the DL-PRS capabilities of the UE 105, and a LPP Provide Location Information message (e.g., providing E-CID measurements). Alternatively, at step 2b, the external client 130, or some entity in the 5GC (e.g. the GMLC 125) requests some location service (e.g. positioning) for the UE 105 to the serving AMF 115. Or, at step 2c, The serving AMF 115 for the UE 105 may be configured to determine a need for some location service (e.g. to locate the UE 105 for an emergency call).

At step 3, the AMF 115 may be configured to invoke a Nlmf_Location_DetermineLocation service operation towards the LMF 120. If step 2a was performed, the service operation may include the MO-LR Request from Step 2a. If steps 2b or 2c were performed, the service operation includes the request for the current location of the UE 105, the LCS client type and may include a required QoS. At step 4, the LMF 120 may perform one or more LPP procedures (e.g., to obtain the DL-PRS positioning capabilities of the UE 105). At step 5, the LMF 120 may be configured to determine a new DL-PRS configuration for one or more gNBs (e.g., the gNB 110a) based on the request received at step 3. The determination at step 5 may also be based on location requests from and/or for other UEs nearby to the UE 105 which are received by the LMF 120 at about the same time.

At step 6, the LMF 120 may be configured to initiate a NRPPa DL-PRS Reconfiguration procedure with each of the gNBs determined at step 5. If some gNBs indicate that the new DL-PRS configuration cannot be supported, the LMF 120 may be configured to perform steps 11 to restore the old DL-PRS configurations in each of the gNBs which indicated a new DL-PRS configuration can be supported in order to avoid interference between gNBs which support the new DL-PRS configuration and gNBs which do not. In this case, the LMF 120 may provide the old DL-PRS configurations to the UE at step 8 instead of the new DL-PRS configurations.

At step 7, each of the gNBs (e.g., the gNB 110a) which acknowledged support of a new DL-PRS configuration at step 6 may be configured to change from an old DL-PRS configuration to a new DL-PRS configuration either after (or just before) sending the acknowledgment at step 6 if no start time was provided or at the start time indicated in step 6. In some cases, the old DL-PRS configuration may correspond to not transmitting a DL-PRS. At step 8, the LMF 120 may be configured to send an LPP Provide Assistance Data message to the UE 105 to provide the new DL-PRS configurations determined at step 5 and acknowledged at step 6. This message may also include the start time for each new DL-PRS configuration and a duration. If steps 2b or 2c were performed, the LMF 120 may initiate LPP and possibly NRPPa procedures to obtain the location of the UE 105.

At step 9, the LMF 120 may return an Nlmf_Location_DetermineLocation Response to the AMF 115. If Step 2a was performed, the message may indicate whether the DL-PRS Assistance Data was successfully transferred. If steps 2b or 2c were performed, the message may include the location of the UE 105. At step 10a, if step 2a was performed, the AMF 115 may forward the response from step 9 to the UE 105 via a MO-LR response. At step 10b, if step 2b was performed, the AMF 115 may forward the response to the external clients 130/5GC LCS Entities .

At step 11, if a duration for the new DL-PRS was not included at step 6, the LMF 120 may be configured to initiate a NRPPa DL-PRS Reconfiguration procedure with each of the gNBs determined at step 5 to restore the old DL-PRS configuration for each gNB. At step 12, each of the gNBs may begin transmitting the old DL-PRS configuration either when the duration received in step 6 expires or after receiving and acknowledging the request to restore the old DL-PRS configuration at step 11. In some cases, the old DL-PRS configuration may correspond to not transmitting a DL-PRS.

Figure 9:
FIG. 9 is an example data structure for requested DL-PRS configuration information.
Figure 10:
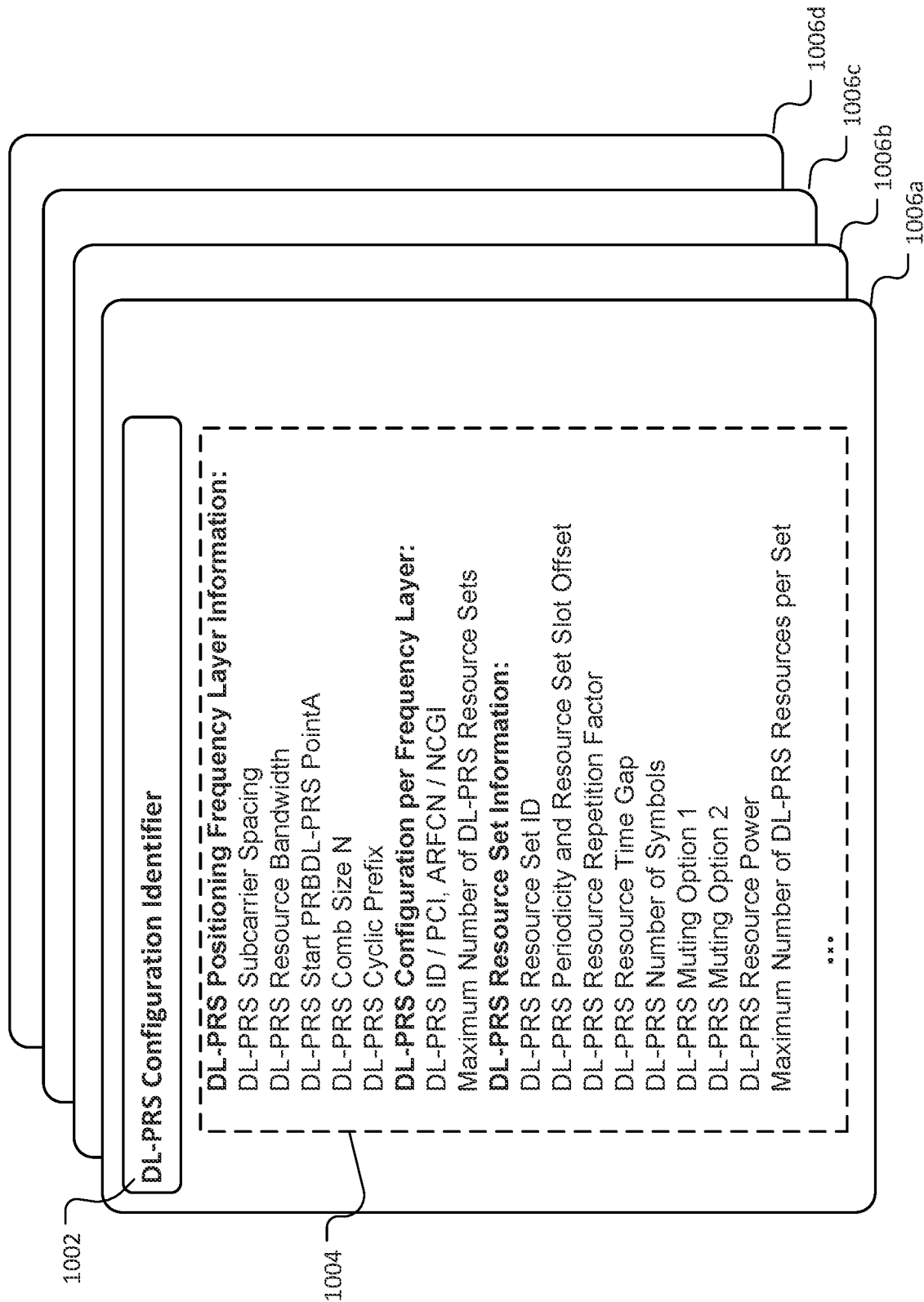
FIG. 10 is an example data structure for DL-PRS configuration information associated with a DL-PRS configuration identifier.

Referring to FIG. 9, an example data structure 900 for requested DL-PRS configuration information is shown. The data structure 900 may be one or more tables and fields configured to be stored and transferred between network entities such as the LMF 120, gNB 110*a*, and UE 105. In an example, the parameters 902 may correspond to the PRS resources depicted in FIG. 7. In an embodiment, the on-demand DL-PRS procedures provided herein may utilize a new Assistance Data Information Element (IE) which includes the parameters 902 as a set of possible DL-PRS configurations. Each DL-PRS configuration in the set may include a number of associated DL-PRS parameters 902. The parameters 902 may be based on requests from a UE or the LMF. For example, a UE-initiated subset of parameters 904 may be based on parameters the UE 105 may be aware of, or have control over. Similarly, a LMF-initiated subset of parameters 906 may be based on the parameters the LMF 120 may desire to modify. The list of parameters in the subset of parameters 904, 906 are examples and not limitations as other subsets may be used.

In an example, referring to FIG. 10, each DL-PRS configuration in the set may be identified by a DL-PRS Configuration Identifier 1002, or similar field. For example, each of the DL-PRS Configuration Identifiers 1002 may be associated with a parameter list and corresponding parameter values 1004 based on the parameters 902 in FIG. 9. Thus, a first DL-PRS parameter set 1006*a* may be identified by the DL-PRS Configuration Identifier 1002, and a second DL-PRS parameter set 1006*b*, a third DL-PRS parameter set 1006*c*, and a fourth DL-PRS parameter set 1006*d* may be identified by respective DL-PRS Configuration Identifiers. Additional DL-PRS parameter sets may also be configured. In an example, the On-Demand-DL-PRS-Configuration IE may be included in one or more posSIBs which may be included in posSI broadcasts. In operation, a UE may be configured to receive the new posSIB and would store the IE On-Demand-DL-PRS-Configuration information. The UE may be configured to obtain the posSIB in different RRC states (i.e., RRC_IDLE, RRC_INACTIVE, RRC_CONNECTED) and thus will be aware which specific DL-PRS configurations may be requested on-demand.

Figure 11:
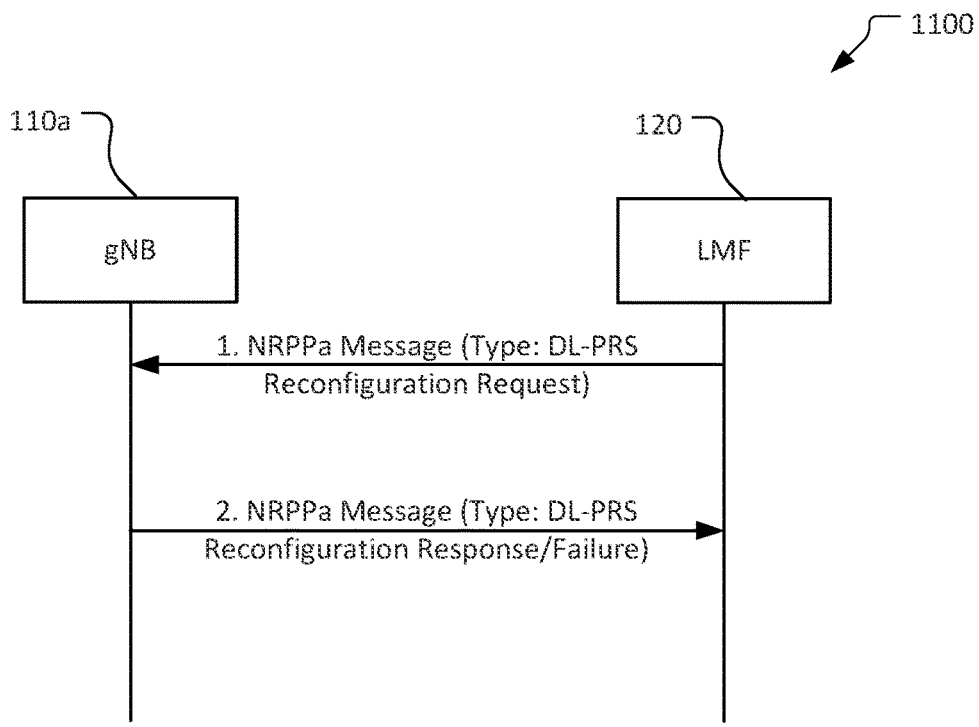
FIG. 11 is an example message flow diagram for a DL-PRS reconfiguration procedure.

Referring to FIG. 11, with further reference to FIGS. 8 and 9, an example message flow 1100 for a DL-PRS reconfiguration is shown. The message flow includes the LMF 120 and one or more TRPs 300, such as the gNB 110*a*. The purpose of the message flow 1100 is to enable the LMF 120 to request a change to DL-PRS transmissions. At step 1, the LMF 120 may be configured to send a NRPPa DL-PRS Reconfiguration Request message to a selected gNB (e.g., the gNB 110*a*) to request a change to DL-PRS transmissions. The message may include DL-PRS configuration information determined for that gNB and may also include a start time for each new DL-PRS configuration and a duration. The DL-PRS configuration for each gNB may be based on one or more of the parameters 902 and used to change the DL-PRS bandwidth, the duration of DL-PRS positioning occasions, the DL-PRS transmission on new frequencies, and/or the frequency of DL-PRS positioning occasions, etc. In an embodiment, the requested DL-PRS configuration may be selected from a set of one or more preconfigured DL-PRS configuration parameter sets 1006*a-d* to support on-demand DL-PRS transmission. In the case of directional DL-PRS beams, the LMF 120 may determine directional DL-PRS beams for each gNB which should be received by a target UE. The directional DL-PRS beams may be selected by the LMF 120 according to a known approximate location for the target UE. At step 2, if the new DL-PRS configuration can be supported by the gNB 110*a*, the gNB 110*a* returns an acknowledgement in a NRPPa DL-PRS Reconfiguration Response message. If the new DL-PRS configuration cannot be supported by the gNB 110*a*, the gNB 110*a* may be configured to return a failure message.

Figure 12:
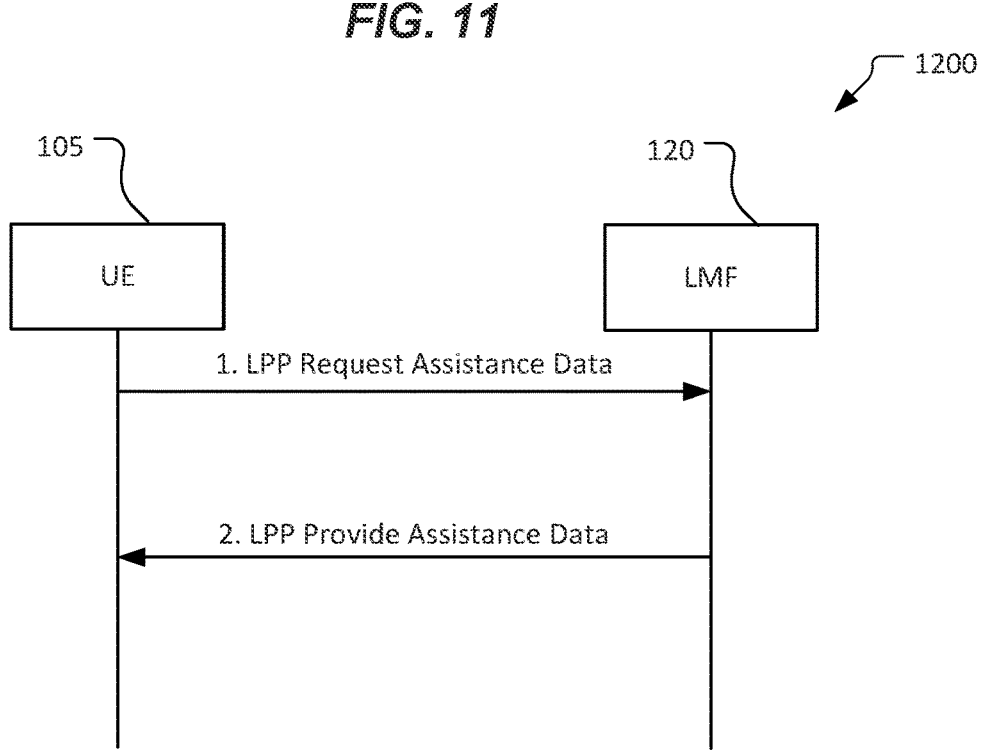
FIG. 12 is an example message flow diagram for an user equipment initiated on-demand DL-PRS request procedure.

Referring to FIG. 12, with further reference to FIGS. 8 and 9, an example message flow 1200 for a UE initiated on-demand DL-PRS request procedure is shown. The message flow 1200 includes the LMF 120 and the UE 105. The purpose of the message flow 1200 is to enable the UE 105 to request changes to DL-PRS transmissions. This procedure is applicable for example in the case where the UE 105 has no knowledge of possible DL-PRS configurations, or in the case the current DL-PRS configuration corresponds to not transmitting a DL-PRS. At step 1, the UE 105 may be configured to send a LPP Request Assistance Data message to the LMF 120 to request a change to one or more DL-PRS transmissions. The message may include the parameters 902 for preferred DL-PRS configurations (which may include a preferred DL-PRS bandwidth, a preferred duration of DL-PRS positioning occasions, preferred DL-PRS beam directions for certain gNBs if known by the UE, etc.). The message may also include a start time and/or time duration for when and/or how long the requested DL-PRS configuration is required at the UE 105 (e.g., number of seconds, minutes or hours for which the DL-PRS configuration is required). The message may be carried in a MO-LR request message as described in step 2*a* of the message flow 800. At step 2, the LMF 120 may be configured to send a LPP Provide Assistance Data message including the new DL-PRS configuration information (e.g., the updated parameters 902) to the UE 105. This message may also include the start time for each new DL-PRS configuration and a duration.

Figure 13:
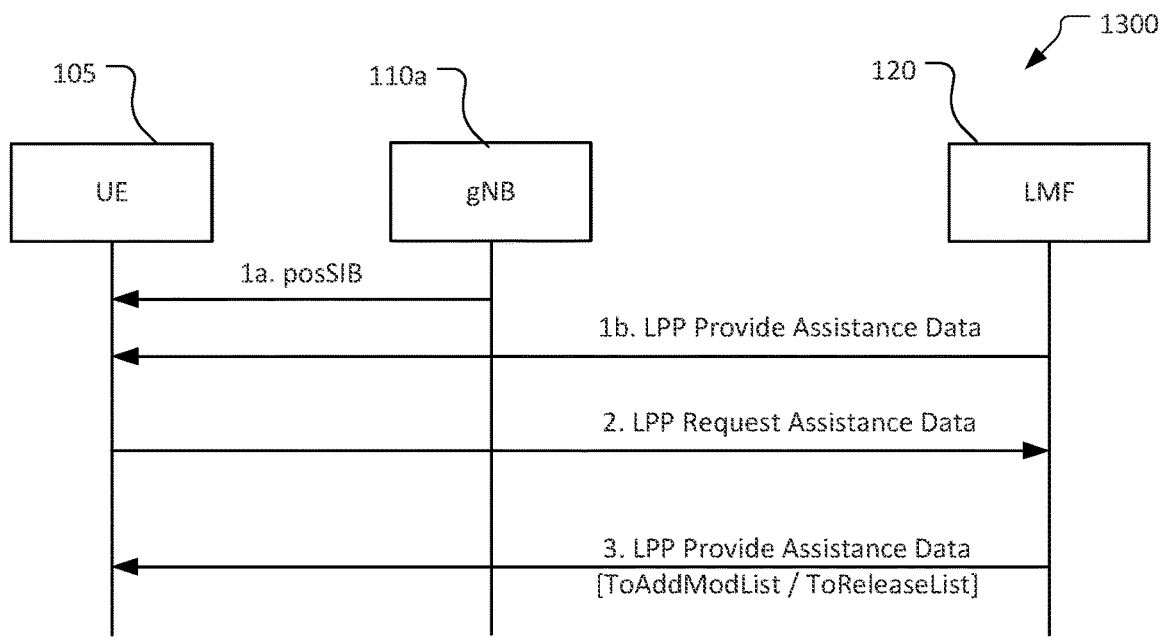
FIG. 13 is an example message flow diagram for an assistance data modification procedure.

Referring to FIG. 13, with further reference to FIGS. 8 and 9, an example message flow 1300 for an assistance data modification procedure is shown. The message flow 1300 includes the UE 105, the gNB 110*a*, and the LMF 120. The purpose of the message flow 1300 is to enable the UE 105 to request a change to DL-PRS transmissions in the case the UE 105 has knowledge of a possible DL-PRS configuration (e.g., via previously provided assistance data or via broadcast information). At step 1*a*, the gNB 110*a* may be configured to broadcast DL-PRS Assistance Data in positioning System Information messages corresponding to the currently active DL-PRS transmission, possibly including an indication of which DL-PRS parameters can be modified on-demand. At step 1*b*, the LMF 120 may be configured to provide DL-PRS Assistance Data corresponding to the currently active DL-PRS transmission to the UE 105 possibly including an indication of which DL-PRS parameters can be modified on-demand (e.g., during an active LPP session). At step 2, the UE 105 is configured to send a LPP Request Assistance Data message to the LMF 120 to request a change to the currently active DL-PRS transmission. The message may include an indication of which DL-PRS parameters 902 are requested to change (which may include a change to DL-PRS bandwidth, a change of DL-PRS positioning occasions, a change of DL-PRS Resources (e.g., "beam ON/OFF" via DL-PRS Resource ID add/release), etc.). The message may also include a start time and/or time duration for when and/or how long the modified DL-PRS configuration is required at the target device (e.g., number of seconds, minutes or hours for which the DL-PRS configuration is required). In the case of step 1a is performed, the message may be carried in a MO-LR request message as described at step 2a of the message flow 800. At step 3, the LMF 120 may be configured to provide a modified LPP Provide Assistance Data message to the UE 105 indicating those DL-PRS parameters (e.g., one or more of the parameters 902) which have been modified compared to the provided assistance data at step 1 and may include a start time and/or duration.

Figure 14:
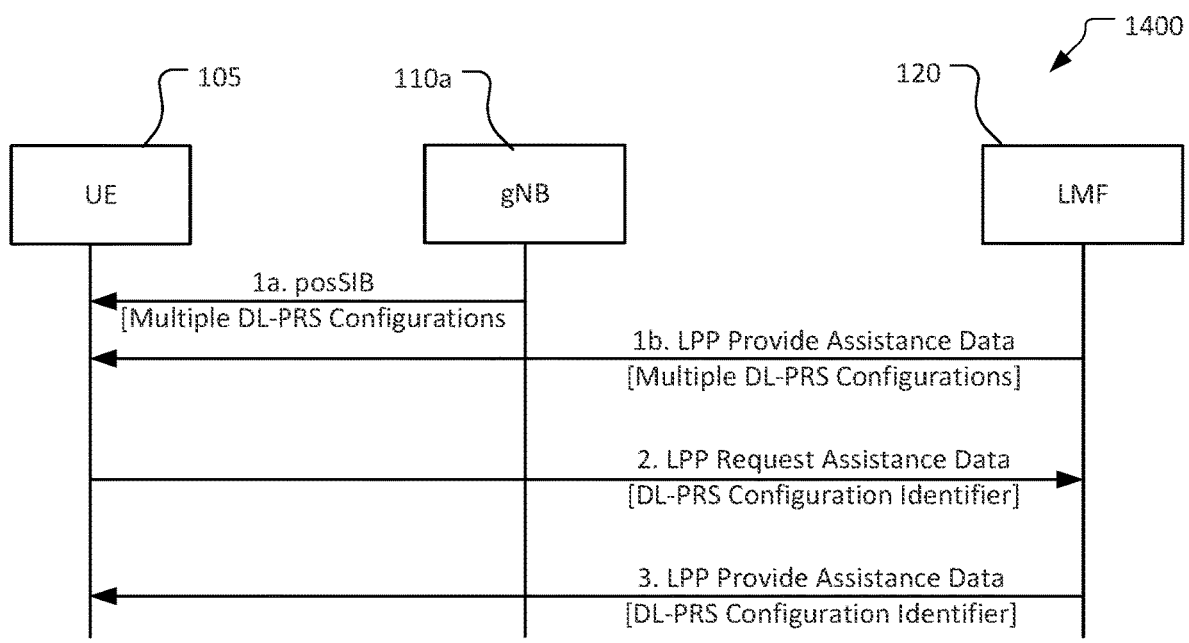
FIG. 14 is an example message flow diagram for an assistance data preconfiguration procedure.

Referring to FIG. 14, with further reference to FIGS. 8 and 9, an example message flow 1400 for an assistance data preconfiguration procedure is shown. The message flow 1400 includes the UE 105, the gNB 110a, and the LMF 120. The purpose of the message flow 1400 is to enable the UE 105 to request a change to DL-PRS transmissions from a set of possible DL-PRS configurations previously provided to the UE 105. At step 1a, the gNB 110a may be configured to broadcast multiple DL-PRS Assistance Data Configurations which can be requested on-demand in positioning System Information as described at step 1b of the message flow 800. The DL-PRS Assistance Data Configurations that are broadcast may be applicable locally (e.g. to the broadcasting gNB 110a and neighbor gNBs (not shown in FIG. 14)) or may be valid throughout a Public Land Mobile Network (PLMN), and may be distinguished by a local/global indication.

At step 1b, the LMF 120 may be configured to provide multiple DL-PRS Assistance Data Configurations to the UE 105 (e.g., as part of a location session). Each DL-PRS configuration in step 1a and 1b may have a unique identifier and may be valid for a certain geographical region and duration; e.g., as defined by the coverage area of the assistance data reference TRP and a validity time. The multiple DL-PRS Assistance Data sets may be provided as a primary configuration (i.e., the currently active or default DL-PRS configuration) together with a certain number of secondary configurations, where the secondary configurations may include only those DL-PRS configuration parameters which are different compared to the primary DL-PRS configuration (i.e., delta signaling). At step 2, the UE 105 may be configured to send a LPP Request Assistance Data message to the LMF 120 to request a change to the DL-PRS transmissions. The message may include the DL-PRS Configuration Identifier 1002 of the requested DL-PRS configuration from the set of possible DL-PRS configurations provided at steps 1a and 1b. In the case when step 1a is performed, the message may be carried in a MO-LR request message as described in step 2b of the message flow 800. At step 3, the LMF 120 may provide the DL-PRS Configuration Identifier 1002 for the new DL-PRS Configuration to the UE 105.

Figure 15:
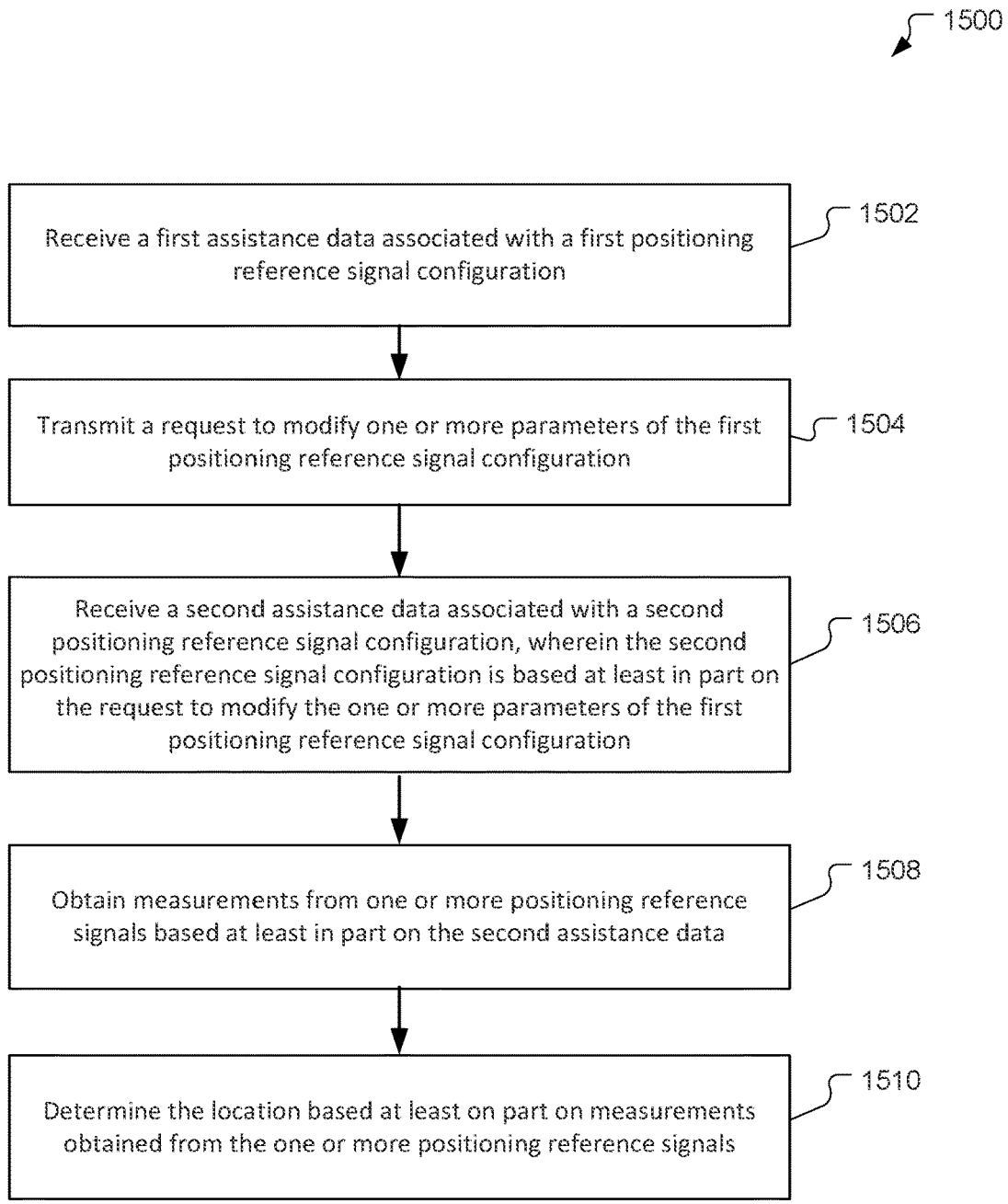
FIG. 15 is a process flow for an example method performed at a user equipment for determining a location using on-demand positioning reference signals.

Referring to FIG. 15, with further reference to FIGS. 1-14, a method 1500, performed at a user equipment, for determining a location using on-demand positioning reference signals includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving a first assistance data associated with a first positioning reference signal configuration. The UE 200, including the transceiver 215 and the processor 230, is a means for receiving the first assistance data. In an embodiment, a TRP 300, such as the gNB 110a, may be configured to broadcast the first assistance data as DL-PRS Assistance Data in positioning System Information messages corresponding to the currently active DL-PRS transmissions. In an example, the first assistance data may include multiple DL-PRS Assistance Data Configurations which can be requested on-demand in positioning System Information. In an embodiment, the LMF 120 may be configured to provide DL-PRS Assistance Data corresponding to the currently active DL-PRS transmission, and may possibly include an indication of which DL-PRS parameters can be modified on-demand (e.g., during an active LPP session).

At stage 1504, the method includes transmitting a request to modify one or more parameters of the first positioning reference signal configuration. The UE 200, including the transceiver 215 and the processor 230, is a means for transmitting the request to modify the one or more parameters. In an example, the UE 200 may be configured to send a LPP Request Assistance Data message to the LMF 120 to request a change to the first positioning reference signal configuration (e.g., the currently active DL-PRS transmission). The message may include an indication of which DL-PRS parameters 902 are requested to change (which may include a change to DL-PRS bandwidth, a change of DL-PRS positioning occasions, a change of DL-PRS Resources (e.g., "beam ON/OFF" via DL-PRS Resource ID add/release), etc.). The message may also include a start time and/or time duration for when and/or how long the modified DL-PRS configuration is required at the target device (e.g., number of seconds, minutes or hours for which the DL-PRS configuration is required). In an embodiment, the request to modify the one or more parameters may be carried in a MO-LR request message as described at step 2a of the message flow 800.

At stage 1506, the method includes receiving a second assistance data associated with a second positioning reference signal configuration, wherein the second positioning reference signal configuration is based at least in part on the request to modify the one or more parameters of the first positioning reference signal configuration. The UE 200, including the transceiver 215 and the processor 230, is a means for receiving the second assistance data. In an embodiment, the LMF 120 may be configured to provide a modified LPP Provide Assistance Data message to the UE 200 indicating those DL-PRS parameters which have been modified compared to the first assistance data provided at stage 1502. In an example, the second assistance data may include a DL-PRS Configuration Identifier 1002 associated with the second positioning reference signal configuration (e.g., the new DL-PRS Configuration).

At stage 1508, the method includes obtaining measurements from one or more positioning reference signals based at least in part on the second assistance data. The UE 200, including the transceiver 215 and the processor 230, is a means for obtaining measurements for the one or more reference signals. The UE 200 is configured to acquire and measures the DL-PRS transmitted by one or more gNBs (e.g., the gNB110a) according to the DL-PRS configurations provided in the second assistance data received at stage 1506. For example, and not a limitation, the UE 200 may obtain UE Rx-Tx Time Difference measurements, ToA, TDoA, RSTD, or other reference signal measurements, based on the DL-PRS transmissions.

At stage 1510, the method includes determining the location based at least on part on the measurements obtained from the one or more positioning reference signals. The UE 200, including the processor 230, is an example means for determining a location. The UE 200 is configured to determine a location based on the DL-PRS measurements obtained at stage 1508. For example, the UE 200 may utilize the UE RxTx Time Difference measurements and gNB RxTx Time Difference measurements to determine the ranges to multiple gNBs, and the locations of the gNBs to determine a current location using a multi RTT positioning technique. Other known positioning technique such as OTDOA, AoD, and ECID may also be used to determine the location of the UE 200.

Figure 16:
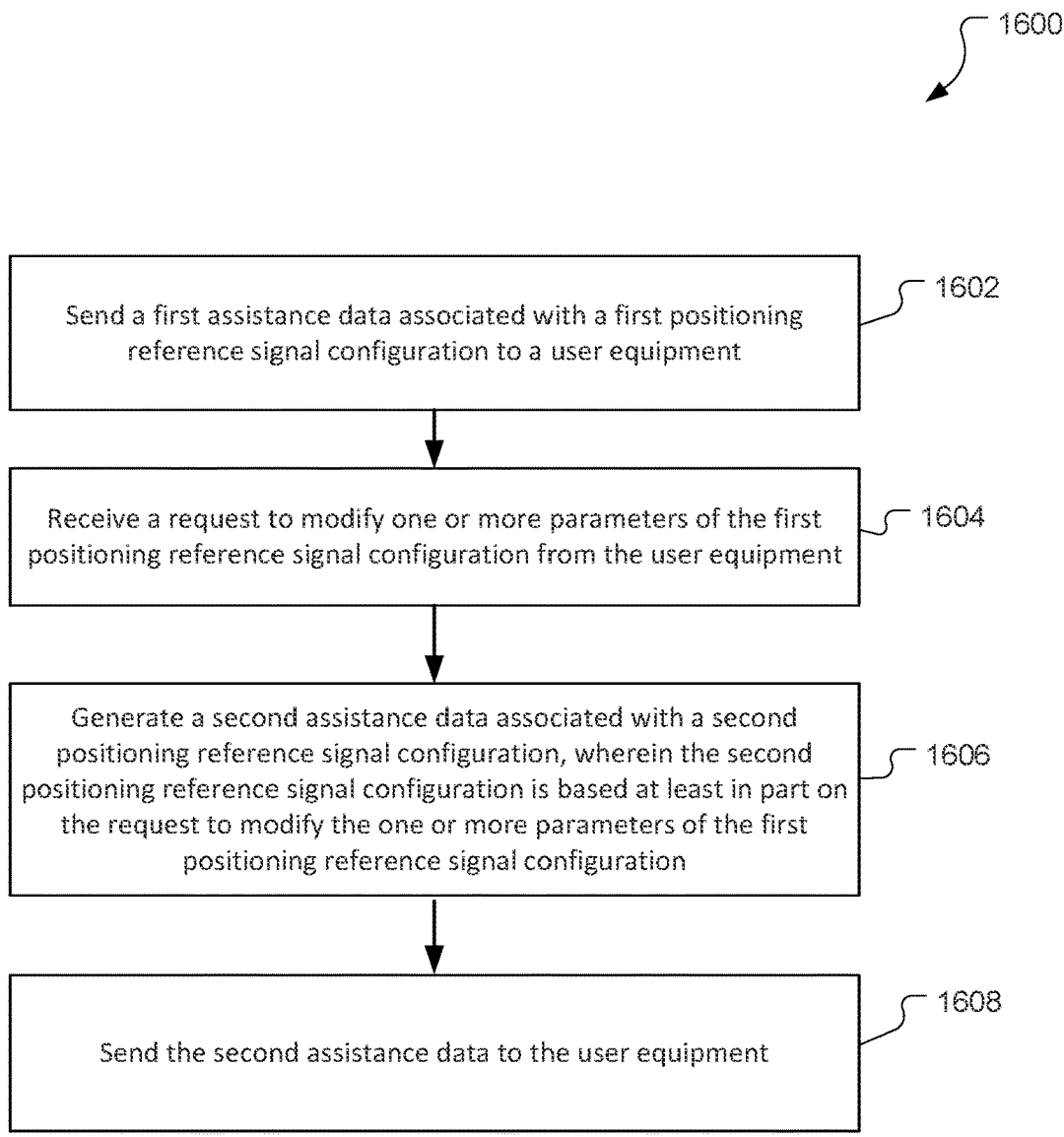
FIG. 16 is a process flow of an example method for providing assistance data associated with on-demand positioning reference signals.

Referring to FIG. 16, with further reference to FIGS. 1-14, a method 1600 for providing assistance data associated with on-demand positioning reference signals includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes sending a first assistance data associated with a first positioning reference signal configuration to a user equipment. A server 400, including the transceiver 415 and the processor 410, is a means for sending the first assistance data. In an embodiment, the LMF 120 may be configured to provide DL-PRS Assistance Data corresponding to the currently active DL-PRS transmission, and may possibly include an indication of which DL-PRS parameters can be modified on-demand (e.g., during an active LPP session). In an example, the first assistance data may include multiple DL-PRS Assistance Data Configurations which can be requested on-demand in positioning System Information.

At stage 1604, the method includes receiving a request to modify one or more parameters of the first positioning reference signal configuration from the user equipment. The server 400, including the transceiver 415 and the processor 410, is a means for receiving the request to modify the one or more parameters. In an example, the UE 200 may be configured to send a LPP Request Assistance Data message to the LMF 120 to request a change to the first positioning reference signal configuration (e.g., the currently active DL-PRS transmission). The message may include an indication of which DL-PRS parameters 902 are requested to change (which may include a change to DL-PRS bandwidth, a change of DL-PRS positioning occasions, a change of DL-PRS Resources (e.g., "beam ON/OFF" via DL-PRS Resource ID add/release), etc.). The message may also include a start time and/or time duration for when and/or how long the modified DL-PRS configuration is required at the target device (e.g., number of seconds, minutes or hours for which the DL-PRS configuration is required). In an embodiment, the request to modify the one or more parameters may be carried in a MO-LR request message as described at step 2a of the message flow 800.

At stage 1606, the method includes generating a second assistance data associated with a second positioning reference signal configuration, wherein the second positioning reference signal configuration is based at least in part on the request to modify the one or more parameters of the first positioning reference signal configuration. The server 400, including the transceiver 415 and the processor 410, is a means for generating the second assistance data. In an embodiment, the LMF 120 may be configured to generate a modified LPP Provide Assistance Data message to indicate the DL-PRS parameter which have been modified compared to the first assistance data provided at stage 1602. In an example, the second assistance data may include a DL-PRS Configuration Identifier 1002 associated with the second positioning reference signal configuration (e.g., the new DL-PRS Configuration).

At stage 1608, the method includes sending the second assistance data to the user equipment. The server 400, including the transceiver 415 and the processor 410, is a means for sending the second assistance data. In an embodiment, the LMF 120 may send the modified LPP Provide Assistance Data message to the UE 200.

Figure 17:
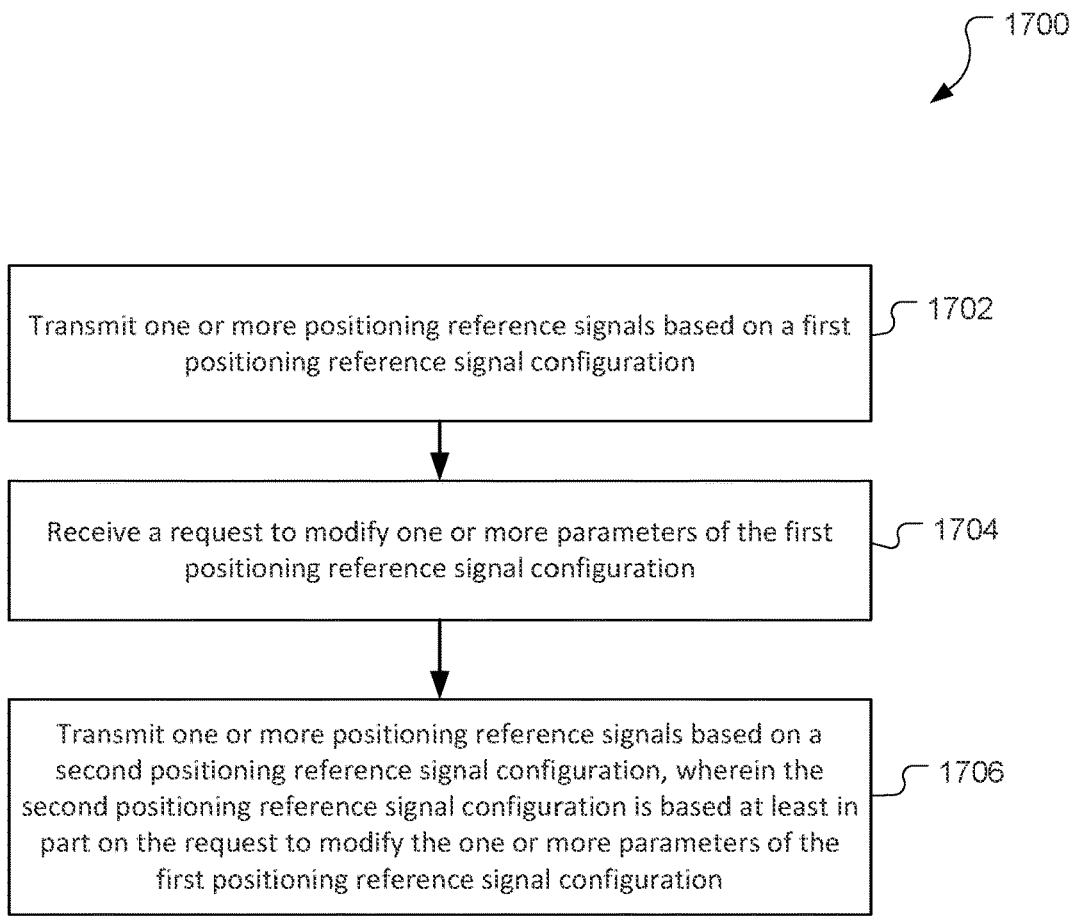
FIG. 17 is a process flow of an example method for transmitting on-demand positioning reference signals.

Referring to FIG. 17, with further reference to FIGS. 1-14, a method 1700 for transmitting on-demand positioning reference signals includes the stages shown. The method 1700 is, however, an example and not limiting. The method 1700 may be altered, e.g., by having stages added, removed, rearranged, combined, performed concurrently, and/or having single stages split into multiple stages.

At stage 1702, the method includes transmitting one or more positioning reference signals based on a first positioning reference signal configuration. A TRP 300, including the transceiver 315 and the processor 310, is a means for transmitting the one or more positioning reference signals. In an embodiment, a TRP 300 such as the gNB 110a, is configured to transmit DL-PRS based on a first configuration. The first PRS configuration may be the PRS transmitted before receiving an on-demand request from a UE or the LMF. In an example, the TRP 300 may be configured to broadcast DL-PRS Assistance Data in positioning System Information messages corresponding to the currently active DL-PRS transmission, possibly including an indication of which DL-PRS parameters can be modified on-demand.

At stage 1704, the method includes receiving a request to modify one or more parameters of the first positioning reference signal configuration. The TRP 300, including the transceiver 315 and the processor 310, is a means for receiving the request to modify the one or more parameters. In an embodiment, the LMF 120 may be configured to send a NRPPa DL-PRS Reconfiguration Request message to the TRP 300 to request a change to DL-PRS transmissions. The message may include DL-PRS configuration information determined for that TRP and may also include a start time for each new DL-PRS configuration and a duration. The DL-PRS configuration for each TRP may be based on one or more of the parameters 902 and used to change the DL-PRS bandwidth, the duration of DL-PRS positioning occasions, the DL-PRS transmission on new frequencies, and/or the frequency of DL-PRS positioning occasions, etc. In an embodiment, the requested DL-PRS configuration may be selected from a set of one or more preconfigured DL-PRS configuration parameter sets 1006a-d to support on-demand DL-PRS transmission. In the case of directional DL-PRS beams, the LMF 120 may determine directional DL-PRS beams for each gNB which should be received by a target UE. The directional DL-PRS beams may be selected by the LMF 120 according to a known approximate location for the target UE.

At stage 1706, the method includes transmitting one or more positioning reference signals based on a second positioning reference signal configuration, wherein the second positioning reference signal configuration is based at least in part on the request to modify the one or more parameters of the first positioning reference signal configuration. The TRP 300, including the transceiver 315 and the processor 310, is a means for transmitting the one or more positioning reference signals. In an embodiment, the TRP 300 may be configured to change from an old DL-PRS configuration (e.g., the first reference signal configuration) to a new DL-PRS configuration (e.g., the second reference signal configuration).

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different disclosures and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for determining a location of a user equipment, comprising: receiving a first assistance data associated with a first positioning reference signal configuration; transmitting a request to modify one or more parameters of the first positioning reference signal configuration; receiving a second assistance data associated with a second positioning reference signal configuration, wherein the second positioning reference signal configuration is based at least in part on the request to modify the one or more parameters of the first positioning reference signal configuration; obtaining measurements from one or more positioning reference signals based at least in part on the second assistance data; and determining the location based at least on part on measurements obtained from the one or more positioning reference signals.

Clause 2. The method of clause 1 wherein the first assistance data includes an indication of one or more positioning reference signal configuration parameters which may be modified on-demand.

Clause 3. The method of clause 1 wherein the first assistance data is received via one or more positioning system information blocks transmitted by a base station.

Clause 4. The method of clause 1 wherein the request to modify the one or more parameters of the first positioning reference signal configuration includes a request to modify at least one of a positioning reference signal bandwidth, a duration of a positioning occasion, and a frequency of the positioning occasion.

Clause 5. The method of clause 1 wherein the request to modify the one or more parameters of the first positioning reference signal configuration includes a positioning reference configuration identifier that is associated with one or more positioning reference signal parameters.

Clause 6. The method of clause 1 wherein the request to modify the one or more parameters of the first positioning reference signal configuration is included in a mobile-originated location request message.

Clause 7. The method of clause 1 wherein the second assistance data is received from a location management function via a Long Term Evolution Positioning Protocol message.

Clause 8. The method of clause 1 wherein the first assistance data is associated with a plurality of positioning reference signal configurations, and transmitting the request to modify the one or more parameters includes providing an identifier associated with one of the plurality of positioning reference signal configurations.

Clause 9. The method of clause 8 wherein receiving the second assistance data includes receiving the identifier associated with the one of the plurality of positioning reference signal configurations.

Clause 10. A method for providing assistance data associated with on-demand positioning reference signals, comprising: sending a first assistance data associated with a first positioning reference signal configuration to a user equipment; receiving a request to modify one or more parameters of the first positioning reference signal configuration from the user equipment; generating a second assistance data associated with a second positioning reference signal configuration, wherein the second positioning reference signal configuration is based at least in part on the request to modify the one or more parameters of the first positioning reference signal configuration; and sending the second assistance data to the user equipment.

Clause 11. The method of clause 10 wherein the first assistance data includes an indication of one or more positioning reference signal configuration parameters which may be modified on-demand.

Clause 12. The method of clause 10 wherein sending the first assistance data includes providing one or more positioning system information blocks to a base station.

Clause 13. The method of clause 10 wherein the request to modify the one or more parameters of the first positioning reference signal configuration includes a request to modify at least one of a positioning reference signal bandwidth, a duration of a positioning occasion, and a frequency of the positioning occasion.

Clause 14. The method of clause 10 wherein the request to modify the one or more parameters of the first positioning reference signal configuration includes a positioning reference configuration identifier that is associated with one or more positioning reference signal parameters.

Clause 15. The method of clause 10 wherein the request to modify the one or more parameters of the first positioning reference signal configuration is included in a mobile-originated location request message.

Clause 16. The method of clause 10 wherein the second assistance data is included in a Long Term Evolution Positioning Protocol message.

Clause 17. The method of clause 10 wherein the first assistance data is associated with a plurality of positioning reference signal configurations, and the request to modify the one or more parameters includes an identifier associated with one of the plurality of positioning reference signal configurations.

Clause 18. The method of clause 17 wherein the second assistance data includes the identifier associated with the one of the plurality of positioning reference signal configurations.

Clause 19. A method for transmitting on-demand positioning reference signals, comprising: transmitting one or more positioning reference signals based on a first positioning reference signal configuration; receiving a request to modify one or more parameters of the first positioning reference signal configuration; and transmitting one or more positioning reference signals based on a second positioning reference signal configuration, wherein the second positioning reference signal configuration is based at least in part on the request to modify the one or more parameters of the first positioning reference signal configuration.

Clause 20. The method of clause 19 wherein the request to modify the one or more parameters of the first positioning reference signal configuration includes a request to modify at least one of a positioning reference signal bandwidth, a duration of a positioning occasion, and a frequency of the positioning occasion.

Clause 21. The method of clause 19 wherein the request to modify the one or more parameters of the first positioning reference signal configuration includes a start time and a duration for transmitting the one or more positioning reference signals based on the second positioning reference signal configuration.

Clause 22. The method of clause 19 wherein the request to modify the one or more parameters of the first positioning reference signal configuration includes a positioning reference configuration identifier that is associated with one or more positioning reference signal parameters.

Clause 23. The method of clause 19 wherein the second positioning reference signal configuration includes a desired beam direction.

Clause 24. An apparatus, comprising: a memory; at least one transceiver; at least one processor communicatively coupled to the memory and the at least one transceiver, and configured to: receive a first assistance data associated with a first positioning reference signal configuration; transmit a request to modify one or more parameters of the first positioning reference signal configuration; receive a second assistance data associated with a second positioning reference signal configuration, wherein the second positioning reference signal configuration is based at least in part on the request to modify the one or more parameters of the first positioning reference signal configuration; obtain measurements from one or more positioning reference signals based at least in part on the second assistance data; and determine a location based at least on part on measurements obtained from the one or more positioning reference signals.

Clause 25. The apparatus of clause 24 wherein the first assistance data includes an indication of one or more positioning reference signal configuration parameters which may be modified on-demand.

Clause 26. The apparatus of clause 24 wherein the first assistance data is received via one or more positioning system information blocks transmitted by a base station.

Clause 27. The apparatus of clause 24 wherein the request to modify the one or more parameters of the first positioning reference signal configuration includes a request to modify at least one of a positioning reference signal bandwidth, a duration of a positioning occasion, and a frequency of the positioning occasion.

Clause 28. The apparatus of clause 24 wherein the request to modify the one or more parameters of the first positioning reference signal configuration includes a positioning reference configuration identifier that is associated with one or more positioning reference signal parameters.

Clause 29. The apparatus of clause 24 wherein the request to modify the one or more parameters of the first positioning reference signal configuration is included in a mobile-originated location request message.

Clause 30. The apparatus of clause 24 wherein the second assistance data is received from a location management function via a Long Term Evolution Positioning Protocol message.

Clause 31. The apparatus of clause 24 wherein the first assistance data is associated with a plurality of positioning reference signal configurations, and the at least one processor is further configured to provide an identifier associated with one of the plurality of positioning reference signal configurations.

Clause 32. The apparatus of clause 31 wherein the at least one processor is further configured to receive the identifier associated with the one of the plurality of positioning reference signal configurations.

Clause 33. An apparatus, comprising: a memory; at least one transceiver; at least one processor communicatively coupled to the memory and the at least one transceiver, and configured to: send a first assistance data associated with a first positioning reference signal configuration to a user equipment; receive a request to modify one or more parameters of the first positioning reference signal configuration from the user equipment; generate a second assistance data associated with a second positioning reference signal configuration, wherein the second positioning reference signal configuration is based at least in part on the request to modify the one or more parameters of the first positioning reference signal configuration; and send the second assistance data to the user equipment.

Clause 34. The apparatus of clause 33 wherein the first assistance data includes an indication of one or more positioning reference signal configuration parameters which may be modified on-demand.

Clause 35. The apparatus of clause 33 wherein the at least one processor is further configured to provide one or more positioning system information blocks to a base station.

Clause 36. The apparatus of clause 33 wherein the request to modify the one or more parameters of the first positioning reference signal configuration includes a request to modify at least one of a positioning reference signal bandwidth, a duration of a positioning occasion, and a frequency of the positioning occasion.

Clause 37. The apparatus of clause 33 wherein the request to modify the one or more parameters of the first positioning reference signal configuration includes a positioning reference configuration identifier that is associated with one or more positioning reference signal parameters.

Clause 38. The apparatus of clause 33 wherein the request to modify the one or more parameters of the first positioning reference signal configuration is included in a mobile-originated location request message.

Clause 39. The apparatus of clause 33 wherein the second assistance data is included in a Long Term Evolution Positioning Protocol message.

Clause 40. The apparatus of clause 33 wherein the first assistance data is associated with a plurality of positioning reference signal configurations, and the request to modify the one or more parameters includes an identifier associated with one of the plurality of positioning reference signal configurations.

Clause 41. The apparatus of clause 40 wherein the second assistance data includes the identifier associated with the one of the plurality of positioning reference signal configurations.

Clause 42. An apparatus, comprising: a memory; at least one transceiver; at least one processor communicatively coupled to the memory and the at least one transceiver, and configured to: transmit one or more positioning reference signals based on a first positioning reference signal configuration; receive a request to modify one or more parameters of the first positioning reference signal configuration; and transmit one or more positioning reference signals based on a second positioning reference signal configuration, wherein the second positioning reference signal configuration is based at least in part on the request to modify the one or more parameters of the first positioning reference signal configuration.

Clause 43. The apparatus of clause 42 wherein the request to modify the one or more parameters of the first positioning reference signal configuration includes a request to modify at least one of a positioning reference signal bandwidth, a duration of a positioning occasion, and a frequency of the positioning occasion.

Clause 44. The apparatus of clause 42 wherein the request to modify the one or more parameters of the first positioning reference signal configuration includes a start time and a duration for transmitting the one or more positioning reference signals based on the second positioning reference signal configuration.

Clause 45. The apparatus of clause 42 wherein the request to modify the one or more parameters of the first positioning reference signal configuration includes a positioning reference configuration identifier that is associated with one or more positioning reference signal parameters.

Clause 46. The apparatus of clause 42 wherein the second positioning reference signal configuration includes a desired beam direction.

Clause 47. An apparatus method for determining a location of a user equipment, comprising: means for receiving a first assistance data associated with a first positioning reference signal configuration; means for transmitting a request to modify one or more parameters of the first positioning reference signal configuration; means for receiving a second assistance data associated with a second positioning reference signal configuration, wherein the second positioning reference signal configuration is based at least in part on the request to modify the one or more parameters of the first positioning reference signal configuration; means for obtaining measurements from one or more positioning reference signals based at least in part on the second assistance data; and means for determining the location based at least on part on measurements obtained from the one or more positioning reference signals.

Clause 48. An apparatus for providing assistance data associated with on-demand positioning reference signals, comprising: means for sending a first assistance data associated with a first positioning reference signal configuration to a user equipment; means for receiving a request to modify one or more parameters of the first positioning reference signal configuration from the user equipment; means for generating a second assistance data associated with a second positioning reference signal configuration, wherein the second positioning reference signal configuration is based at least in part on the request to modify the one or more parameters of the first positioning reference signal configuration; and means for sending the second assistance data to the user equipment.

Clause 49. An apparatus for transmitting on-demand positioning reference signals, comprising: means for transmitting one or more positioning reference signals based on a first positioning reference signal configuration; means for receiving a request to modify one or more parameters of the first positioning reference signal configuration; and means for transmitting one or more positioning reference signals based on a second positioning reference signal configuration, wherein the second positioning reference signal configuration is based at least in part on the request to modify the one or more parameters of the first positioning reference signal configuration.

Clause 50. A non-transitory processor-readable storage medium comprising processor-readable instructions configured to cause one or more processors to determine a location of a user equipment, comprising: code for receiving a first assistance data associated with a first positioning reference signal configuration; code for transmitting a request to modify one or more parameters of the first positioning reference signal configuration; code for receiving a second assistance data associated with a second positioning reference signal configuration, wherein the second positioning reference signal configuration is based at least in part on the request to modify the one or more parameters of the first positioning reference signal configuration; code for obtaining measurements from one or more positioning reference signals based at least in part on the second assistance data; and code for determining the location based at least on part on measurements obtained from the one or more positioning reference signals.

Clause 51. A non-transitory processor-readable storage medium comprising processor-readable instructions configured to cause one or more processors to provide assistance data associated with on-demand positioning reference signals, comprising: code for sending a first assistance data associated with a first positioning reference signal configuration to a user equipment; code for receiving a request to modify one or more parameters of the first positioning reference signal configuration from the user equipment; code for generating a second assistance data associated with a second positioning reference signal configuration, wherein the second positioning reference signal configuration is based at least in part on the request to modify the one or more parameters of the first positioning reference signal configuration; and sending the second assistance data to the user equipment.

Clause 52. A non-transitory processor-readable storage medium comprising processor- readable instructions configured to cause one or more processors to transmit on-demand positioning reference signals, comprising: code for transmitting one or more positioning reference signals based on a first positioning reference signal configuration; code for receiving a request to modify one or more parameters of the first positioning reference signal configuration; and code for transmitting one or more positioning reference signals based on a second positioning reference signal configuration, wherein the second positioning reference signal configuration is based at least in part on the request to modify the one or more parameters of the first positioning reference signal configuration.

The invention claimed is:

1. A method for determining a location of a user equipment, comprising:
   transmitting a request for assistance data including a prioritized list of desired downlink positioning reference signal configurations;
   receiving assistance data including one or more downlink positioning reference signal configurations based at least in part on the prioritized list of desired downlink positioning reference signal configurations;
   obtaining measurements from one or more positioning reference signals based at least in part on the assistance data; and
   determining the location based at least in part on measurements obtained from the one or more positioning reference signals.

2. The method of claim 1 further comprising receiving multiple downlink positioning reference signal configurations, wherein the prioritized list of desired downlink positioning reference signal configurations includes one or more of the multiple downlink positioning reference signal configurations.

3. The method of claim 2 further comprising receiving an indication of one or more down link positioning reference signal configuration parameters which may be modified on-demand.

4. The method of claim 2 wherein the multiple downlink positioning reference signal configurations are received via one or more positioning system information blocks transmitted by a base station.

5. The method of claim 1 wherein the assistance data is received from a location management function via a Long Term Evolution Positioning Protocol message.

6. The method of claim 1 wherein transmitting the request for the assistance data includes providing a prioritized list of identifiers associated with the desired downlink positioning reference signal configurations.

7. The method of claim 6 wherein receiving the assistance data including the one or more downlink positioning reference signal configurations includes receiving one or more identifiers in the prioritized list of identifiers.

8. The method of claim 1 wherein the request for the assistance data including the prioritized list of desired downlink positioning reference signal configurations is included in a mobile-originated location request message.

9. An apparatus, comprising:
a memory;
at least one transceiver;
at least one processor communicatively coupled to the memory and the at least one transceiver, and configured to:
transmit a request for assistance data including a prioritized list of desired downlink positioning reference signal configurations;
receive assistance data including one or more downlink positioning reference signal configurations based at least in part on the prioritized list of desired downlink positioning reference signal configurations;
obtain measurements from one or more positioning reference signals based at least in part on the assistance data; and
determine a location based at least in part on measurements obtained from the one or more positioning reference signals.

10. The apparatus of claim 9 wherein the at least one processor is further configured to receive multiple downlink positioning reference signal configurations, wherein the prioritized list of desired downlink positioning reference signal configurations includes one or more of the multiple downlink positioning reference signal configurations.

11. The apparatus of claim 10 wherein the at least one processor is further configured to receive an indication of one or more down link positioning reference signal configuration parameters which may be modified on-demand.

12. The apparatus of claim 10 wherein the at least one processor is further configured to receive the multiple downlink positioning reference signal configurations via one or more positioning system information blocks transmitted by a base station.

13. The apparatus of claim 9 wherein the at least one processor is further configured to receive the assistance data via a Long Term Evolution Positioning Protocol message.

14. The apparatus of claim 9 wherein the at least one processor is further configured to transmit the request for assistance data including a prioritized list of identifiers associated with the desired downlink positioning reference signal configurations.

15. The apparatus of claim 14 wherein the at least one processor is further configured to receive the assistance data including one or more identifiers in the prioritized list of identifiers.

16. The apparatus of claim 9 wherein the at least one processor is further configured to transmit the request for the assistance data via a mobile-originated location request message.

17. An apparatus for determining a location of a user equipment, comprising:
means for transmitting a request for assistance data including a prioritized list of desired downlink positioning reference signal configurations;
means for receiving assistance data including one or more downlink positioning reference signal configurations based at least in part on the prioritized list of desired downlink positioning reference signal configurations;
means for obtaining measurements from one or more positioning reference signals based at least in part on the assistance data; and
means for determining the location based at least in part on measurements obtained from the one or more positioning reference signals.

18. The apparatus of claim 17 further comprising means for receiving multiple downlink positioning reference signal configurations, wherein the prioritized list of desired downlink positioning reference signal configurations includes one or more of the multiple downlink positioning reference signal configurations.

19. The apparatus of claim 18 further comprising means for receiving an indication of one or more down link positioning reference signal configuration parameters which may be modified on-demand.

20. The apparatus of claim 18 wherein the multiple downlink positioning reference signal configurations are received via one or more positioning system information blocks transmitted by a base station.

21. The apparatus of claim 17 wherein the assistance data is received from a location management function via a Long Term Evolution Positioning Protocol message.

22. The apparatus of claim 17 wherein the means for transmitting the request for the assistance data includes means for providing a prioritized list of identifiers associated with the desired downlink positioning reference signal configurations.

23. The apparatus of claim 22 wherein the means for receiving the assistance data including the one or more downlink positioning reference signal configurations includes means for receiving one or more identifiers in the prioritized list of identifiers.

24. The apparatus of claim 17 wherein the request for the assistance data including the prioritized list of desired downlink positioning reference signal configurations is included in a mobile-originated location request message.

25. A non-transitory processor-readable storage medium comprising processor-readable instructions configured to cause one or more processors to determine a location of a user equipment, comprising:
code for transmitting a request for assistance data including a prioritized list of desired downlink positioning reference signal configurations;
code for receiving assistance data including one or more downlink positioning reference signal configurations based at least in part on the prioritized list of desired downlink positioning reference signal configurations;
code for obtaining measurements from one or more positioning reference signals based at least in part on the assistance data; and
code for determining the location based at least in part on measurements obtained from the one or more positioning reference signals.

26. The non-transitory processor-readable storage medium of claim 25 further comprising code for receiving multiple downlink positioning reference signal configurations, wherein the prioritized list of desired downlink positioning reference signal configurations includes one or more of the multiple downlink positioning reference signal configurations.

27. The non-transitory processor-readable storage medium of claim 26 further comprising code for receiving an indication of one or more down link positioning reference signal configuration parameters which may be modified on-demand.

28. The non-transitory processor-readable storage medium of claim 25 wherein the code for transmitting the request for the assistance data includes code for providing a prioritized list of identifiers associated with the desired downlink positioning reference signal configurations.

29. The non-transitory processor-readable storage medium of claim 28 wherein the code for receiving the assistance data including the one or more downlink positioning reference signal configurations includes code for receiving one or more identifiers in the prioritized list of identifiers.

30. The non-transitory processor-readable storage medium of claim 25 wherein the request for the assistance data including the prioritized list of desired downlink positioning reference signal configurations is included in a mobile-originated location request message.

* * * * *